United States Patent [19]

Kawamura et al.

[11] Patent Number: 4,533,613
[45] Date of Patent: Aug. 6, 1985

[54] DISAZO COMPOUNDS AND PHOTOCONDUCTIVE COMPOSITION AS WELL AS ELECTROPHOTOGRAPHIC LIGHT SENSITIVE ELEMENT CONTAINING THE SAME

[75] Inventors: Kouichi Kawamura; Seiji Horie; Naonori Makino; Hideo Sato, all of Kanagawa, Japan

[73] Assignee: Fuji Photo Film Co., Ltd., Kanagawa, Japan

[21] Appl. No.: 530,313

[22] Filed: Sep. 8, 1983

[30] Foreign Application Priority Data

Sep. 8, 1982 [JP] Japan ................................. 57-156403

[51] Int. Cl.$^3$ .............................................. G03G 5/06
[52] U.S. Cl. ......................................... 430/78; 430/76
[58] Field of Search ....................... 430/72, 73, 74, 76, 430/78

[56] References Cited

U.S. PATENT DOCUMENTS 4,272,598  6/1981  Sasaki et al. ....................... 430/78 X
4,427,753  1/1984  Fujimura et al. .................. 430/78 X Primary Examiner—John D. Welsh
Attorney, Agent, or Firm—Sughrue, Mion, Zinn, Macpeak, and Seas

[57] ABSTRACT

An electrophotographic light sensitive element is disclosed. The element is comprised of a photoconductive support base having provided thereon a disazo compound dispersed in a binder or a charge carrier-transporting medium. A novel group of disazo compounds are disclosed as represented by the general formula (I), (II) and (III) as defined within the specification. In addition to the light sensitive element the disazo compounds and electrophotographic compositions containing them are part of the invention disclosed. The electrophotographic light sensitive elements have high sensitivity and long durability.

10 Claims, 1 Drawing Figure

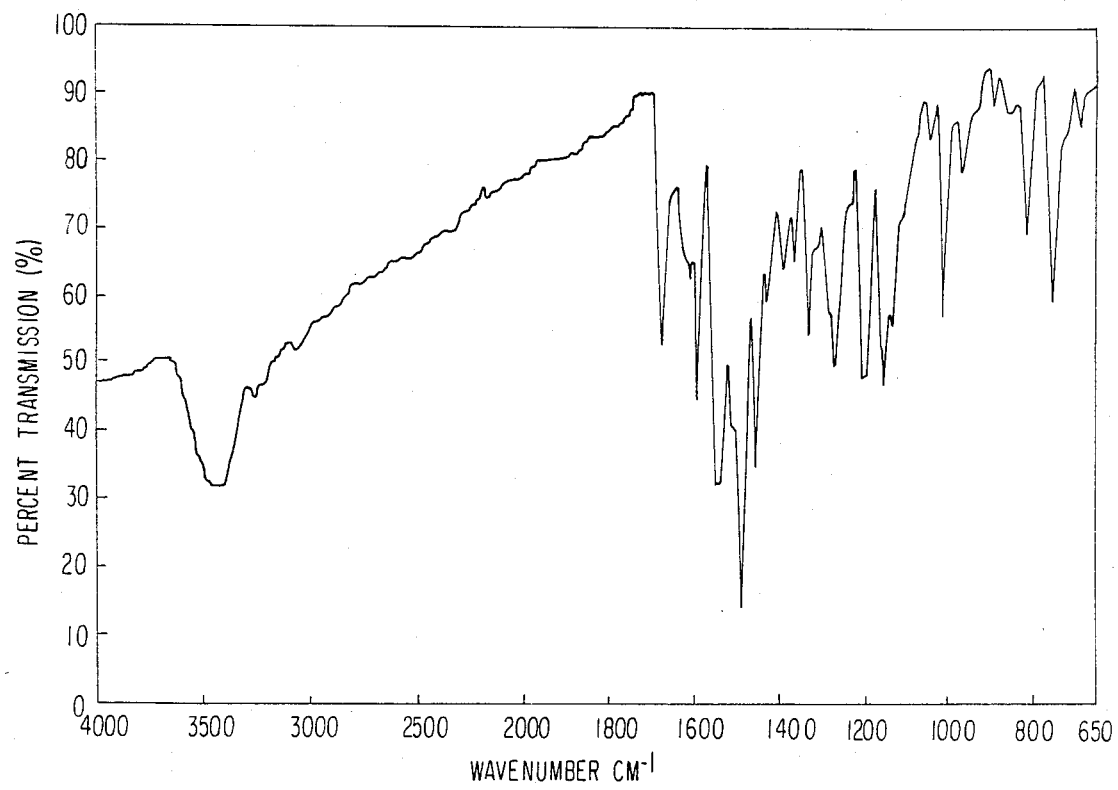

DISAZO COMPOUNDS AND PHOTOCONDUCTIVE COMPOSITION AS WELL AS ELECTROPHOTOGRAPHIC LIGHT SENSITIVE ELEMENT CONTAINING THE SAME

FIELD OF THE INVENTION

The present invention relates to a novel disazo compound and a photoconductive composition containing the disazo compound as well as an electrophotographic light sensitive element comprising an electrophotographic light sensitive layer containing the disazo compound.

BACKGROUND OF THE INVENTION

A photoconductive process of an electrophotographic light sensitive element comprises:
(1) a step of generating electric charges due to exposure to light, and,
(2) a step of transporting the charges.

A typical example of a material in which steps (1) and (2) are carried out using the same substance such as a selenium light sensitive plate. On the other hand, as an example of materials in which steps (1) and (2) are effected by different substances, the combination of amorphous selenium and poly-N-vinylcarbazole is well known. A method wherein steps (1) and (2) are effected by different substances is advantageous in that the range for selecting raw materials used for electrophotographic light sensitive elements is broadened, electrophotographic properties such as sensitivity, acceptable electric potentials, etc. of electrophotographic light sensitive elements are improved with the broadened range, and substances convenient for preparation of coatings of electrophotographic light sensitive elements can be chosen over a wide range.

Typical examples of photoconductive substances of electrophotographic light sensitive elements which have been heretofore used in electrophotography include inorganic substances such as selenium, cadmium sulfide, zinc oxide, etc.

Carlson has already clarified in U.S. Pat. No. 2,297,691, that a photoconductive substance comprising a support having coated thereon a material which is insulate in the dark and changes electrical resistivity depending upon the amount of imagewise exposure can be employed in electrophotography. First, surface charges are uniformly imparted to the photoconductive substance in the dark, generally after dark adaptation during a suitable period of time. Next, the substance is imagewise exposed by an irradiated pattern which has the effect of reducing the surface charges depending upon relative energy contained in various parts of the irradiated pattern. The surface charges or electrostatic latent images thus remaining at the surface of a layer of the photoconductive substance (electrophotographic light sensitive layer) are converted into visible images by bringing the surface into contact with a suitable indicator for detecting charges, i.e., a toner.

Toners are contained in an insulating solution or a dry carrier; in any case, toners can be adhered to the surface of an electrophotographic light sensitive layer depending upon charge pattern. The thus adhered indicator can be fixed by conventional means such as heat, pressure, solvent vapor, etc. Further, electrostatic latent images can be transferred to a second support (e.g., paper, film, etc.). In a similar manner, it is possible to transfer electrostatic latent images to a second support and develop there. Electrophotography is one of the image-forming methods designed so as to form images as described above.

In such electrophotography, the following basic properties are required for electrophotographic light sensitive elements:
(1) electrophotographic light sensitive elements are electrically charged to an appropriate potential in the dark;
(2) discipitation of charges is less in the dark;
(3) charges can be readily discharged by light exposure; etc.

Inorganic substances described above that are conventionally employed have many advantages but also have various disadvantages. For example, selenium which is now widely used satisfies the requirements (1) to (3) described above but it is not desirable because it is difficult to set forth conditions for production thereof, production costs are high, it is difficult to finish up selenium to a belt form due to lack of flexibility, and care must be taken when handling selenium due to its sensitivity to heat and mechanical impact, etc. Cadium sulfide or zinc oxide is dispersed in a resin as a binder and the dispersion is used as an electrophotographic light sensitive element; but due to mechanical drawbacks in smoothness, hardness, tensile strength, antiabrasion, etc., they cannot be used repeatedly.

In recent years, electrophotographic light sensitive elements using various organic substances have been proposed to eliminate the drawbacks of such inorganic substances and, some are provided for actual use. For example, there are an electrophotographic light sensitive element comprising poly-N-vinylcarbazole and 2,4,7-trinitrofluoren-9-one (U.S. Pat. No. 3,484,237), an electrophotographic light sensitive element comprising poly-N-vinylcarbazole sensitized with a pyrilium salt dyestuff (U.S. Pat. No. 3,617,268), an electrophotographic light sensitive element comprising an organic pigment as a main ingredient (U.S. Pat. No. 3,898,084), an electrophotographic light sensitive element containing as a main ingredient a co-crystal complex comprising a dye and a resin (U.S. Pat. Nos. 3,732,180 and 3,684,502), etc.

In these organic electrophotographic light sensitive elements, mechanical properties and flexibility of the aforesaid inorganic electrophotographic light sensitive elements are improved to some extent but light sensitivity is generally poor and they are unsuited for repeated use; these conventional electrophotographic light sensitive elements do not sufficiently meet the requirements for electrophotographic light sensitive elements.

SUMMARY OF THE INVENTION

As a result of extensive investigations with an attempt to improve the foregoing drawbacks involved in conventional electrophotographic light sensitive elements, the present inventors have found that electrophotographic light sensitive elements containing a novel disazo compound have high sensitivity and long durability to such an extent that can be provided sufficiently for actual use.

The present invention relates to a novel disazo compound (disazo pigment) represented by the following general formulae (I) to (III), a photoconductive composition comprising the same and an electrophotographic light sensitive element comprising an electrophotographic light sensitive layer containing the disazo compound.

More specifically, the present invention relates to:
(1) disazo compounds represented by general formula (I), (II) or (III) shown below:

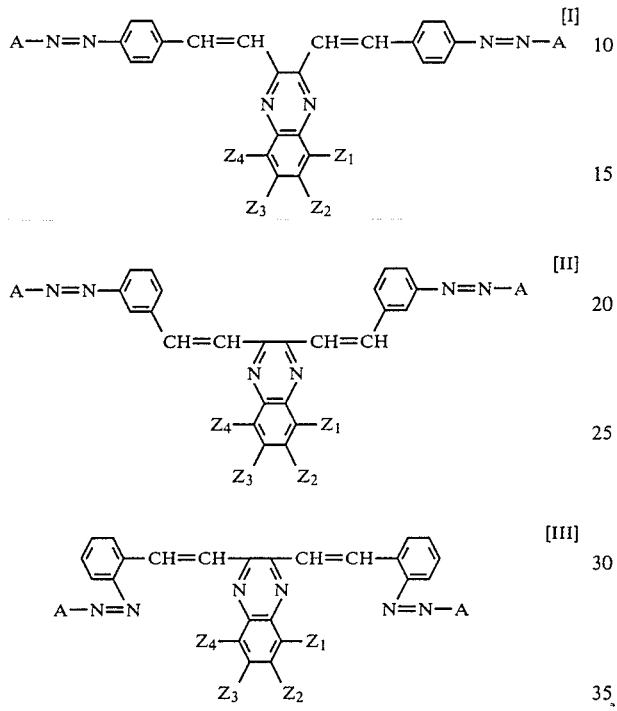

wherein:

A represents:

X represents an atomic group necessary to complete an aromatic ring such as a naphthalene ring, an anthracene ring, etc. or a heterocyclic ring such as an indole ring, a carbazole ring, a benzocarbazole ring, a dibenzofuran ring, etc. (these rings may be substituted or unsubstituted), by condensing with the benzene ring in the above formula to which a hydroxy group and Y are attached;

Y represents:

$$-\overset{O}{\underset{}{C}}-N\overset{R^4}{\underset{R^5}{}} \text{ or } -\overset{O}{\underset{}{C}}-O-R^5$$

$R^1$ represents a hydrogen atom, an alkyl group, a phenyl group or a substituted group thereof;

$R^2$ represents a hydrogen atom, a lower alkyl group, a carbamoyl group, a carboxyl group, an alkoxycarbonyl group, an aryloxycarbonyl group, or a substituted or unsubstituted amino group;

$R^3$ and $R^5$ each represents an alkyl group; an aromatic ring group such as a phenyl group, a naphthyl group, an anthryl group, etc.; a heterocyclic aromatic ring group such as a dibenzofuranyl group, a carbazolyl group, a benzocarbazolyl group, an indolyl group, etc.; or a substituted group thereof;

$R^4$ represents a hydrogen atom, an alkyl group, a phenyl group or a substituted group thereof;

$Z_1$, $Z_2$, $Z_3$ and $Z_4$, which may be the same or different, represents a hydrogen atom, a halogen atom, an alkyl group, a nitro group, an alkoxy group, an alkoxycarbonyl group or an aryloxycarbonyl group.

(2) photoconductive composition comprising the disazo compound represented by general formula (I), (II) or (III) described above; and (3) electrophotographic light sensitive elements comprising an electrophotographic light sensitive layer containing the disazo compound represented by general formula (I), (II) or (III) described above.

BRIEF DESCRIPTION OF THE DRAWING

The FIGURE is an infrared absorption spectrum (KBr method) of disazo compound (2) of the present invention.

DETAILED DESCRIPTION OF THE PREFERRED EMBODIMENTS

The electrophotographic light sensitive element containing the disazo compound of the present invention has a great characteristic, in addition to high sensitivity and high durability, that the disazo compound can easily be synthesized at low costs in a large scale as compared to disazo compounds as disclosed in Japanese Patent Applications OPI Nos. 14967/79 and 116038/81. This is because it is unnecessary to conduct a Wittig's reaction during the preparation and therefore unnecessary to employ strong bases such as sodium hydride, sodium methoxide, sodium amide, etc. and no special equipment is required.

The disazo compounds represented by general formulae (I) to (III) are described below in more detail.

X is a group capable of forming an aromatic ring such as a naphthalene ring, an anthracene ring, etc. or a heterocyclic ring such as an indole ring, a carboazole ring, a benzocarbazole ring, a dibenzofuran ring, etc., by condensing with the benzene ring to which a hydroxyl group and Y are attached.

When X is an aromatic ring or heterocyclic ring having a substituent(s) thereon, examples of substituents include a halogen atom (e.g., a fluorine atom, a chlorine atom, a bromine atom, an iodine atom, etc.), a lower alkyl group, preferably a lower alkyl group having 1 to 8 carbon atoms (e.g., a methyl group, an ethyl group, a propyl group, a butyl group, an isopropyl group, an isobutyl group, etc.). The number of the substituent(s) is 1 or 2; when the substituents are 2, they may be the same or different.

Examples of $R^1$ include a hydrogen atom, an alkyl group, preferably an alkyl group having 1 to 12 carbon atoms, or a phenyl group.

When $R^1$ is an unsubstituted alkyl group, specific examples thereof include a methyl group, an ethyl group, a propyl group, a butyl group, a pentyl group, a hexyl group, an isopropyl group, an isobutyl group, an isoamyl group, an isohexyl group, a neopentyl group, a tert-butyl group, etc.

When $R^1$ is a substituted alkyl group, the substituents are exemplified by a hydroxy group, an alkoxy group having 1 to 12 carbon atoms, a cyano group, an amino group, an alkylamino group having 1 to 12 carbon atoms, a dialkylamino group having 2 alkyl groups having 1 to 12 carbon atoms, a halogen atom, an aryl group having 6 to 15 carbon atoms, etc. Specific examples of substituted alkyl groups include a hydroxyalkyl group (e.g., a hydroxymethyl group, a 2-hydroxyethyl group, a 3-hydroxypropyl group, a 2-hydroxypropyl group, etc.), an alkoxyalkyl group (e.g., a methoxymethyl group, a 2-methoxyethyl group, a 3-methoxypropyl group, an ethoxymethyl group, a 2-ethoxyethyl group, etc.), a cyanoalkyl group (e.g., a cyanomethyl group, a 2-cyanoethyl group, etc.), an aminoalkyl group (e.g., an aminomethyl group, a 2-aminoethyl group, a 3-aminopropyl group, etc.), an (alkylamino)alkyl group (e.g., a (methylamino)methyl group, a 2-(methylamino)ethyl group, an (ethylamino)methyl group, a (dialkylamino)alkyl group (e.g., a (dimethylamino)methyl group, a 2-(dimethylamino)ethyl group, etc.), a halogenoalkyl group (e.g., a fluoromethyl group, a chloromethyl group, a bromomethyl group, etc.) and an aralkyl group (e.g., a benzyl group, a phenethyl group, etc.).

When $R^1$ is a substituted phenyl group, substituents are exemplified by a hydroxy group, an alkoxy group having 1 to 12 carbon atoms, a cyano group, an amino group, an alkylamino group having 1 to 12 carbon atoms, dialkylamino groups having two alkyl groups having 1 to 12 carbon atoms, a halogen atom, an alkyl group having 1 to 6 carbon atoms, nitro group, etc. Specific examples of substituted phenyl groups include a hydroxyphenyl group, an alkoxyphenyl group (e.g., a methoxyphenyl group, an ethoxyphenyl group, etc.), a cyanophenyl group, an aminophenyl group, an (alkylamino)phenyl group (e.g., a (methylamino)phenyl group, an (ethylamino)phenyl group, etc.), a (dialkylamino)phenyl group (e.g., a (dimethylamino)phenyl group, etc.), a halogenophenyl group (e.g., a fluorophenyl group, a chlorophenyl group, a bromophenyl group, etc.), an alkylphenyl group (e.g., a tolyl group, an ethylphenyl group, a cumenyl group, a xylyl group, a mesityl group, etc.), a nitrophenyl group, and substituents (positions of the substituents and positional relation of plural substituents are optional) having 2 or 3 of these groups (which may be the same or different).

For $R^2$, a hydrogen atom, a lower alkyl group having 1 to 6 carbon atoms, a carbamoyl group, a carboxyl group, an alkoxycarbonyl group having 1 to 12 carbon atoms, an aryloxycarbonyl group having an aryloxy group having 6 to 12 carbon atoms and a substituted or unsubstituted amino group are preferred.

When $R^2$ is a substituted amino group, specific examples thereof include a methylamino group, an ethylamino group, a propylamino group, a phenylamino group, a tolylamino group, a benzylamino group, a phenethylamino group, a dimethylamino group, a diethylamino group, a diphenylamino group, etc.

When $R^2$ is a lower alkyl group, specific examples thereof include a methyl group, an ethyl group, a propyl group, a butyl group, an isopropyl group, an isobutyl group, etc.

When $R^2$ is an alkoxycarbonyl group, specific examples thereof include a methoxycarbonyl group, an ethoxycarbonyl group, a propoxycarbonyl group, a butoxycarbonyl group, an isopropoxycarbonyl group, a benzyloxycarbonyl group, etc.

When $R^2$ is an aryloxycarbonyl group, specific examples thereof include a phenoxycarbonyl group, a tolyloxycarbonyl group, etc.

Preferred examples of $R^3$ and $R^5$, include an alkyl group having 1 to 20 carbon atoms, an aromatic ring group such as a phenyl group, a naphthyl group, etc., a heterocyclic aromatic ring group containing an oxygen atom, a nitrogen atom, a sulfur atom, etc., such as a dibenzofuranyl group, a carbazolyl group, a benzocarbazolyl group, etc. and substituted groups thereof.

When $R^3$ or $R^5$ is a substituted or unsubstituted alkyl group, specific examples thereof are the same as those for the substituted or unsubstituted alkyl group for $R^1$ described above, respectively.

When $R^3$ or $R^5$ is a substituted aromatic group such as a substituted phenyl group, a substituted naphthyl group, etc., or a substituted aromatic group containing a hetero atom, such as a substituted dibenzofuranyl group or a substituted carbazolyl group, etc., specific examples of the substituents include a hydroxy group, a cyano group, a nitro group, a halogen atom (e.g., a fluorine atom, a chlorine atom, a bromine atom, a fluorine atom, iodine atom), an alkyl group having 1 to 12 carbon atoms (e.g., a methyl group, an ethyl group, a propyl group, an isopropyl group, etc.), an alkoxy group having 1 to 12 carbon atoms (e.g., a methoxy group, an ethoxy group, a propoxy group, a butoxy group, a pentyloxy group, an isopropoxy group, an isobutoxy group, an isoamyloxy group, a tertbutoxy group, a neopentyloxy group, etc.), an amino group, an alkylamino group having 1 to 12 carbon atoms (e.g., a methylamino group, an ethylamino group, a propylamino group, etc.), a dialkylamino group having 1 to 12 carbon atoms (e.g., a dimethylamino group, a diethylamino group, an N-methyl-N-ethylamino group, etc.), an arylamino group having 6 to 12 carbon atoms (e.g., a phenylamino group, a tolylamino group, etc.), a diarylamino group having 2 aryl groups having 6 to 15 carbon atoms (e.g., a diphenylamino group, etc.), a carboxyl group, an alkali metal carboxylate group (examples of alkali metals (cations): Na+, K+, Li+, etc.), an alkali metal sulfonate group (examples of alkali metals (cations); Na+, K+, Li+, etc.), an alkylcarbonyl group (e.g., an acetyl group, a propionyl group, a benzylcarbonyl group, etc.), an arylcarbonyl group having an aryl group having 6 to 12 carbon atoms (e.g., a benzoyl group, a toluoyl group, etc.), an alkylthio group having 1 to 12 carbon atoms (e.g., a methylthio group, an ethylthio group, etc.), or an arylthio group having 1 to 12 carbon atoms (e.g., a phenylthio group, a tolylthio group, etc.). The number of the substituent(s) is in the range of 1 to 3; in the case of binding plural substituents, they may be the same or different or may take an optional combination and, the position of the substituents attached is optional.

Examples of R⁴ include a hydrogen atom, an alkyl group having 1 to 20 carbon atoms, a phenyl group or substituted groups thereof.

When R⁴ is a substituted or unsubstituted alkyl or phenyl group, specific examples thereof are the same as those for the substituted or unsubstituted alkyl group and phenyl group in R³ and R⁵ described above.

As A derived from couplers,

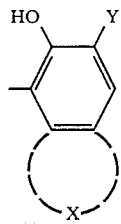

is preferred in that they provide photoconductive compositions or electrophotographic light sensitive layers having high sensitivity to light. Further, raw materials for synthesis can easily be obtained so that disazo compounds can be prepared at low costs.

Further, a group capable of forming a naphthalene ring, a carbazole ring, a benzocarbazole ring or a dibenzofuran ring are preferred as X and as Y,

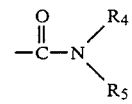

is preferred.

Examples of halogen atoms for $Z_1$, $Z_2$, $Z_3$ and $Z_4$ include a fluorine atom, a chlorine atom, a bromine atom and an iodine atom. Examples of alkyl groups include a methyl group, an ethyl group, a propyl group, a butyl group, an isopropyl group, an isobutyl group, a t-butyl group, etc. and alkyl groups having 1 to 6 carbon atoms are preferred.

In the case of an alkoxy group and an alkoxycarbonyl group represented by structural formulae:
—OR₆ and —CO₂R₆, respectively,
R₆ represents a lower alkyl group having 1 to 6 carbon atoms or a substituted alkyl group.

In the case of an aryloxycarbonyl group represented by the structural formula: —CO₂R₇, R₇ represents a phenyl group or a substituted phenyl group.

Specific examples of the alkoxycarbonyl group and the aryloxycarbonyl group shown by $Z_1$ and $Z_4$ may be the same as those for $R_2$.

Hereafter specific examples of the disazo compounds of the present invention are given.

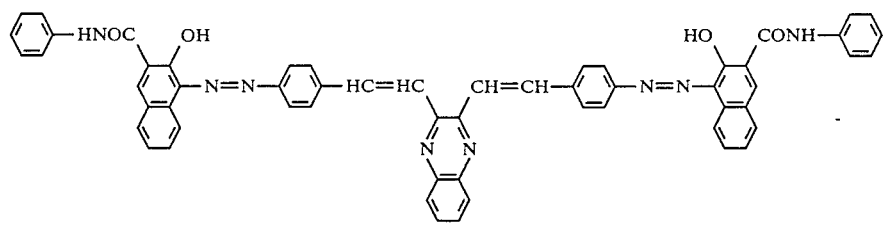

(1)

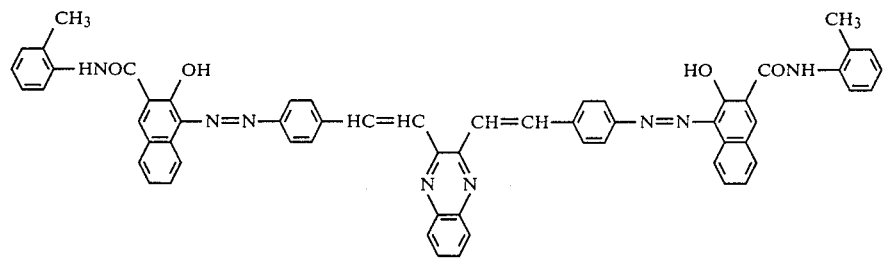

(2)

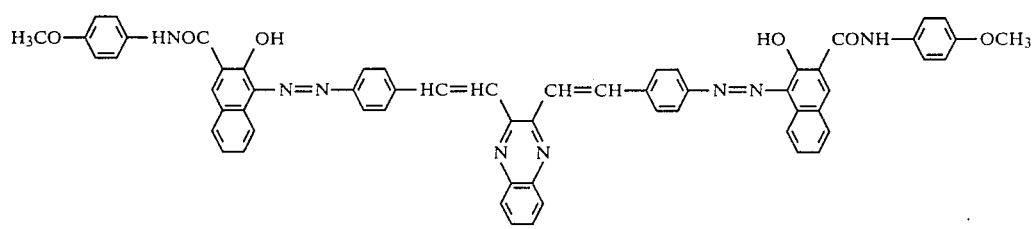

(3)

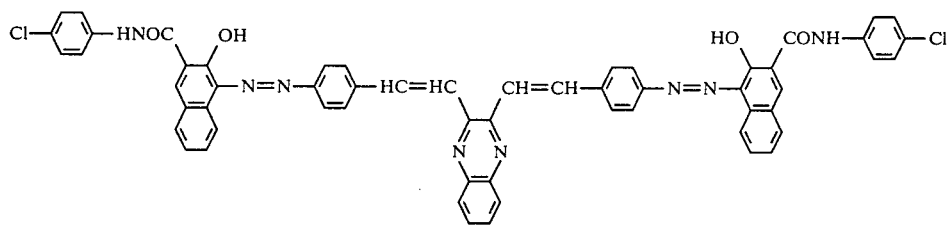
(4)
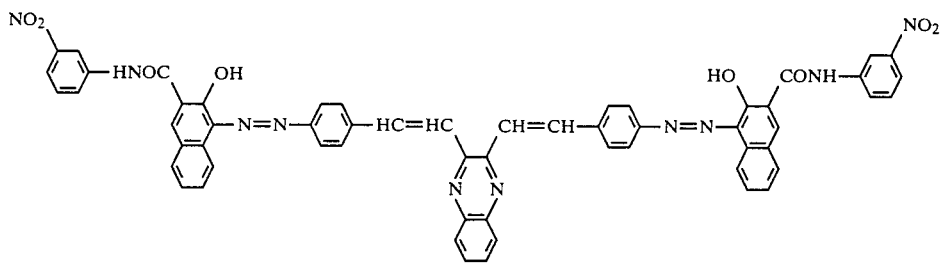
(5)
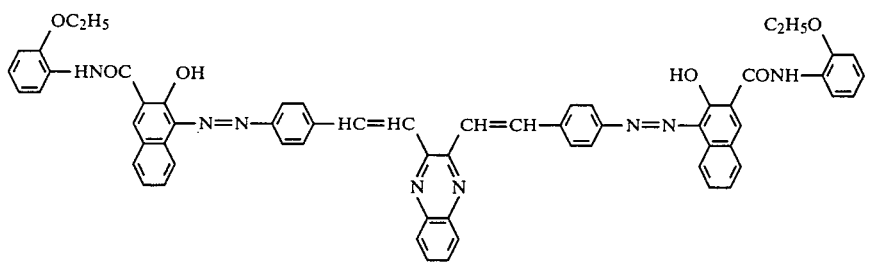
(6)
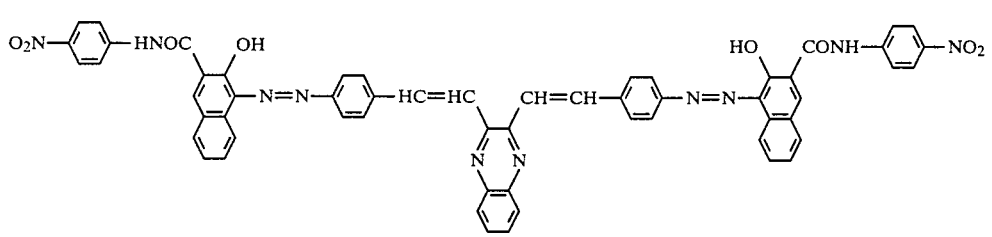
(7)
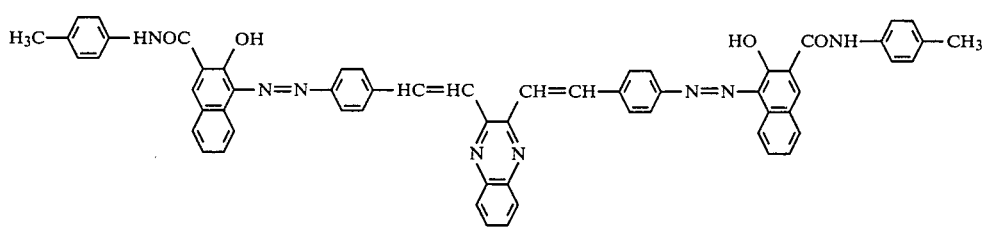
(8)

-continued
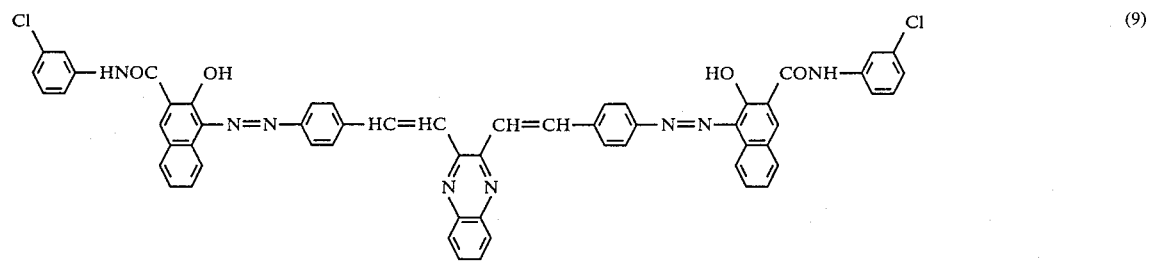
(9)
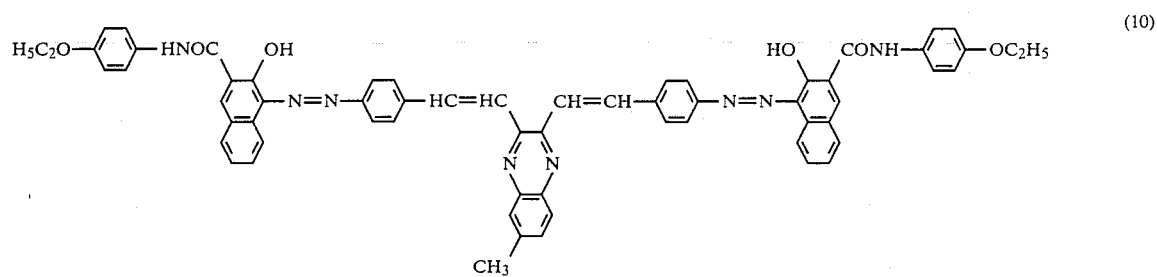
(10)
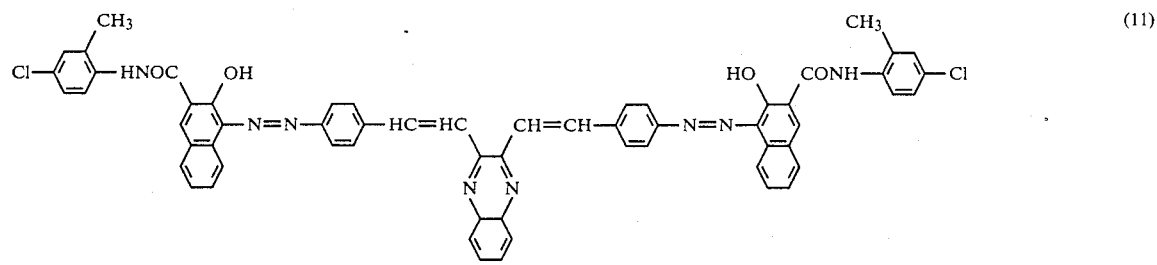
(11)
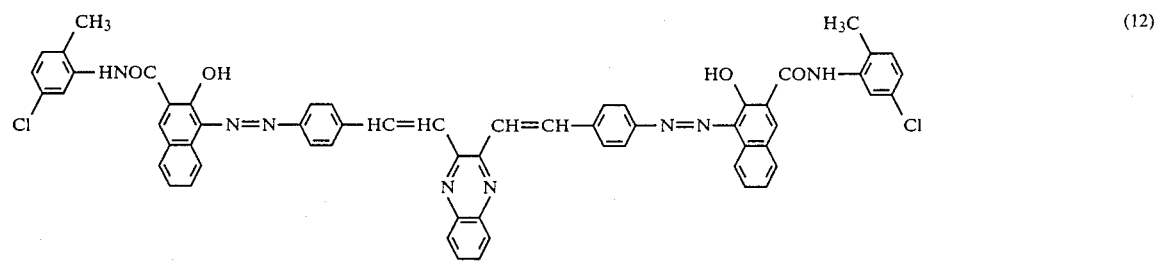
(12)
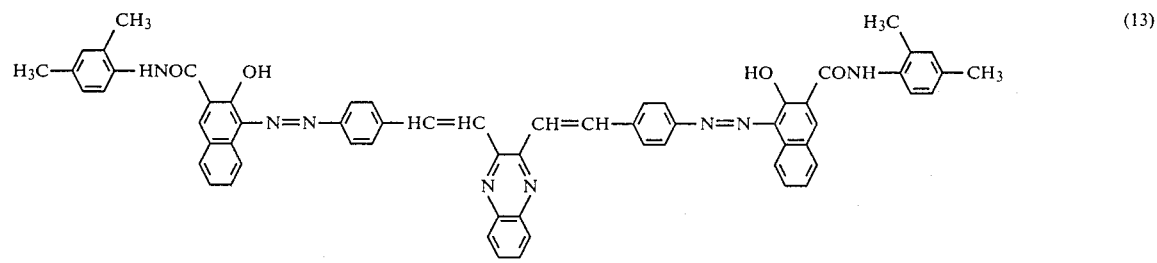
(13)

-continued
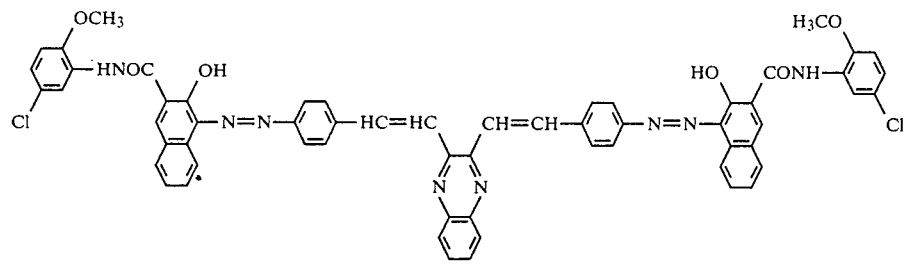 (14)
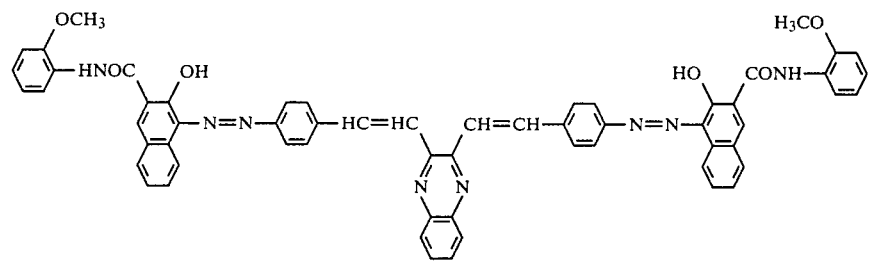 (15)
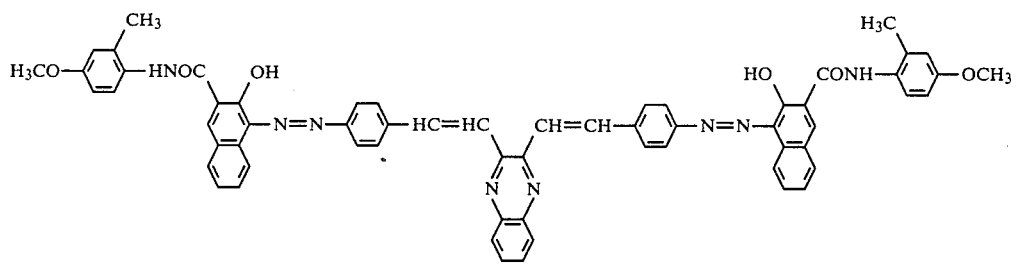 (16)
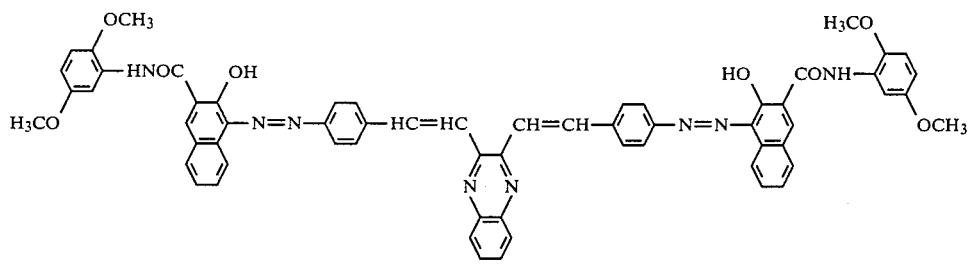 (17)
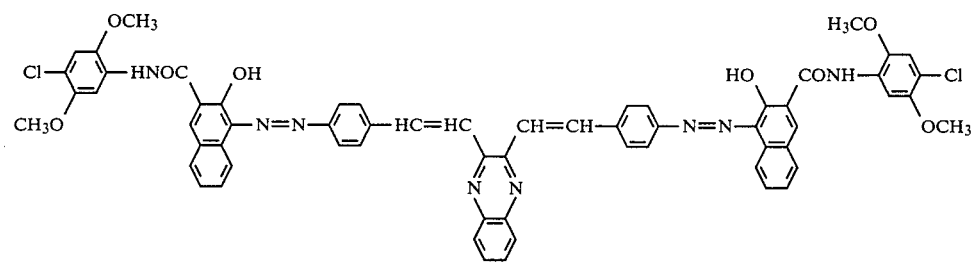 (18)

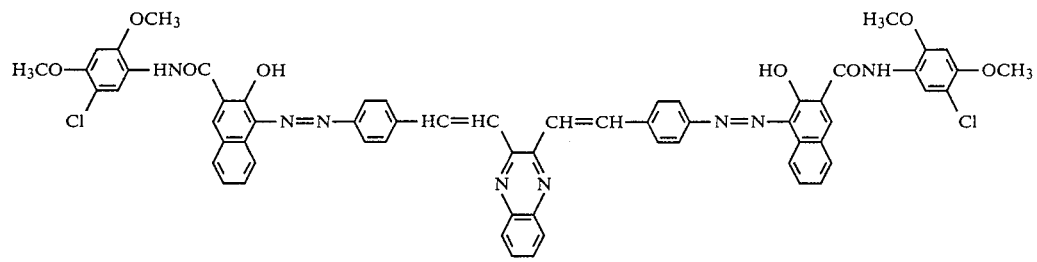
(19)
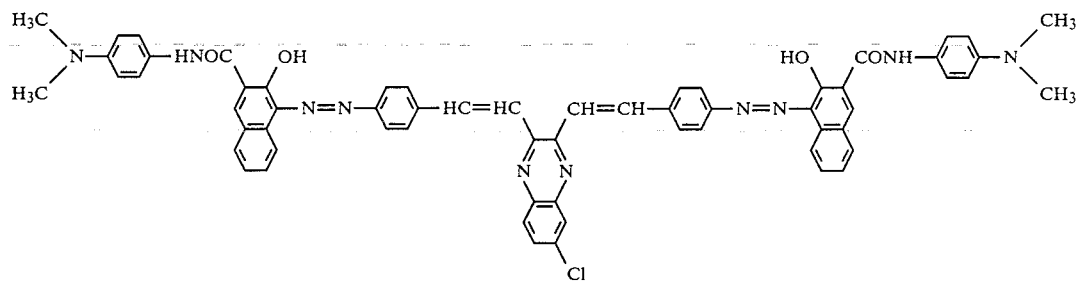
(20)
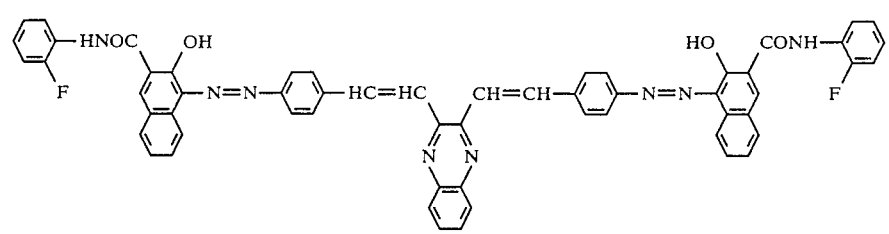
(21)
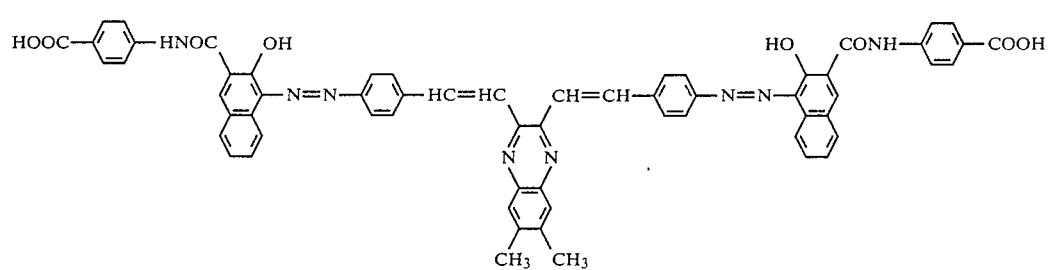
(22)
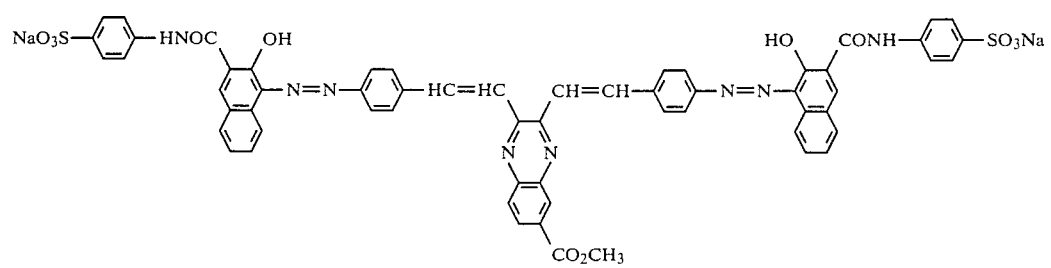
(23)

-continued
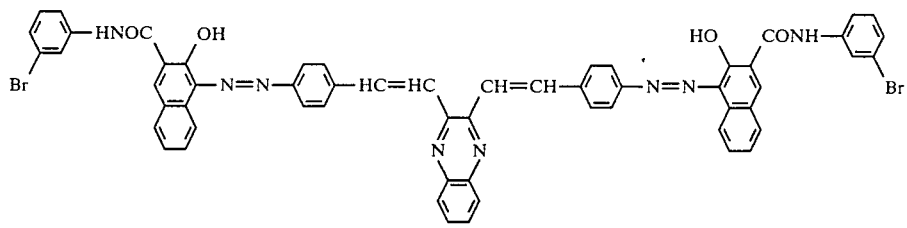
(24)
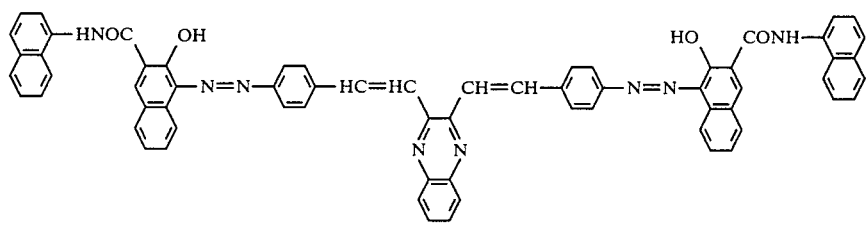
(25)
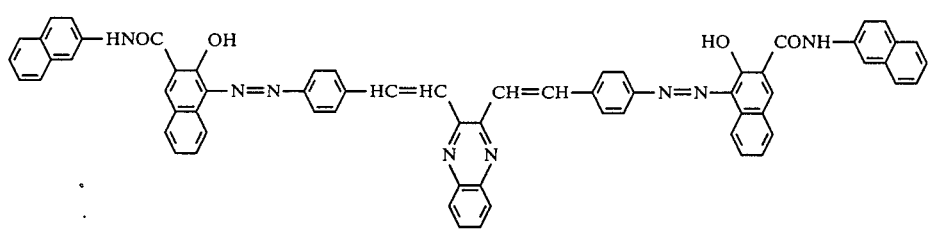
(26)
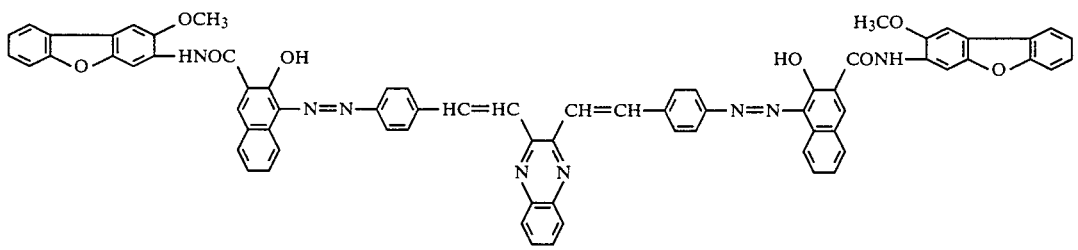
(27)
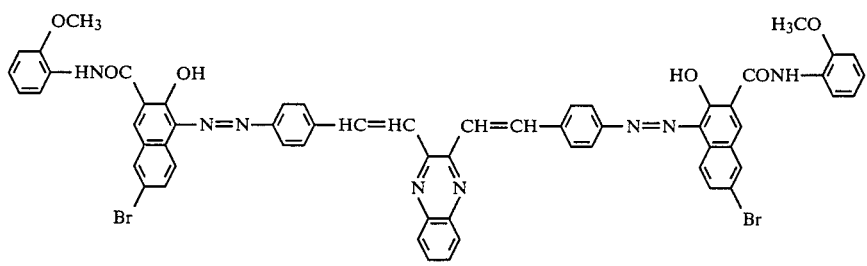
(28)

-continued
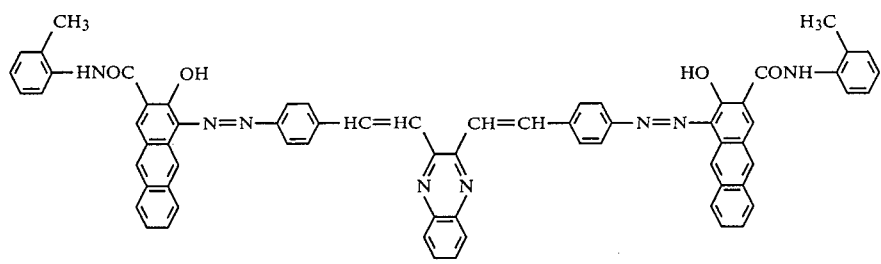
(29)
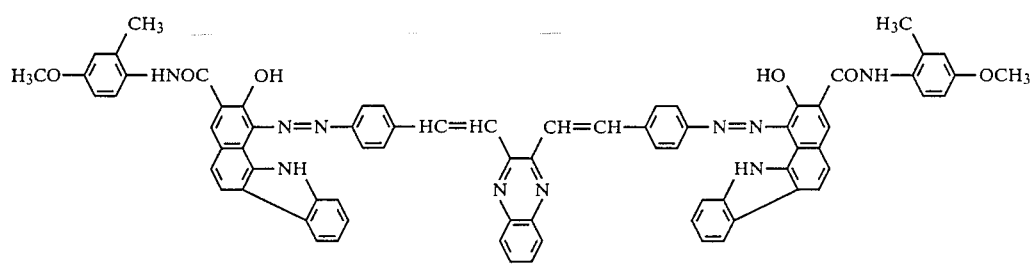
(30)
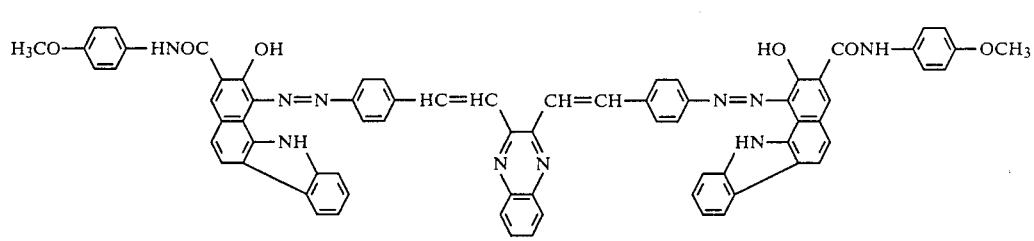
(31)
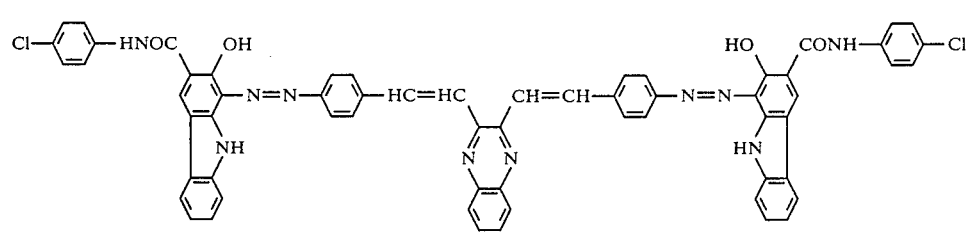
(32)
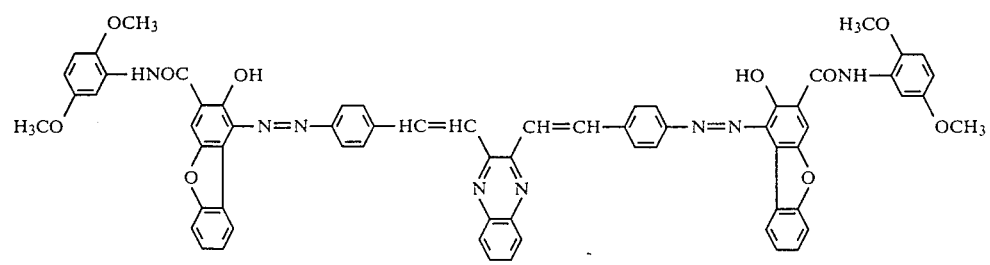
(33)

-continued
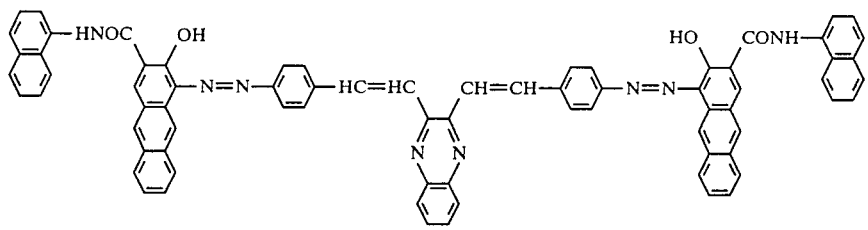 (34)
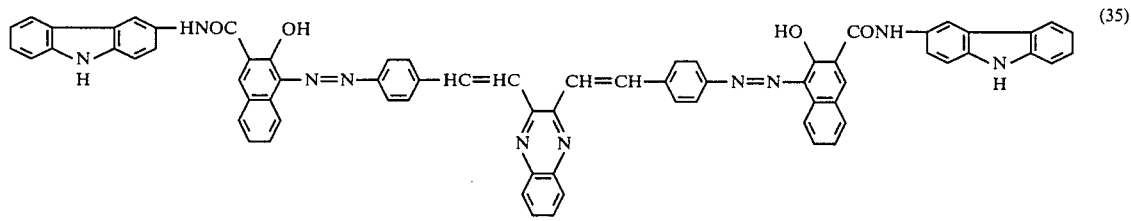 (35)
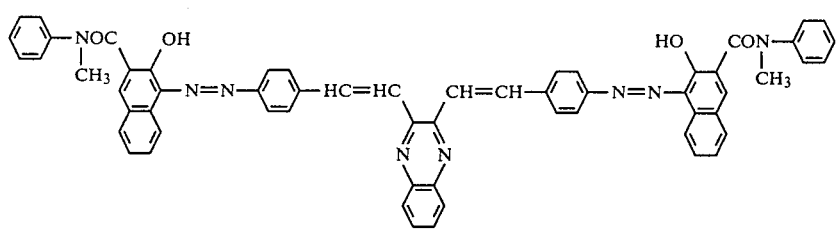 (36)
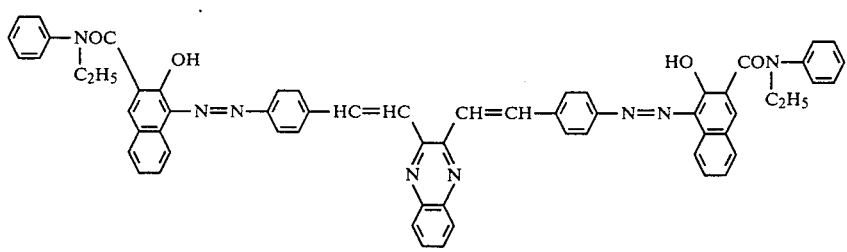 (37)
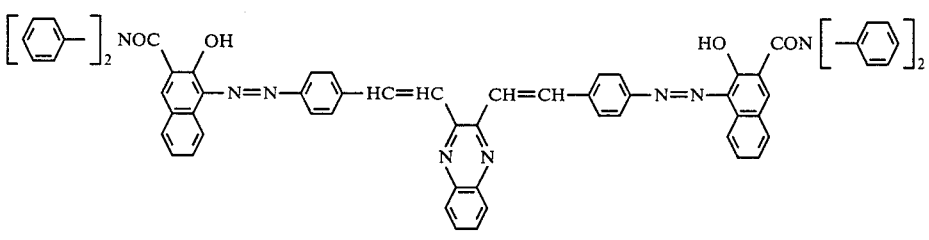 (38)
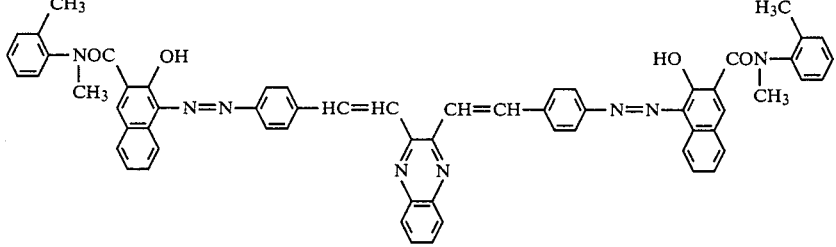 (39)

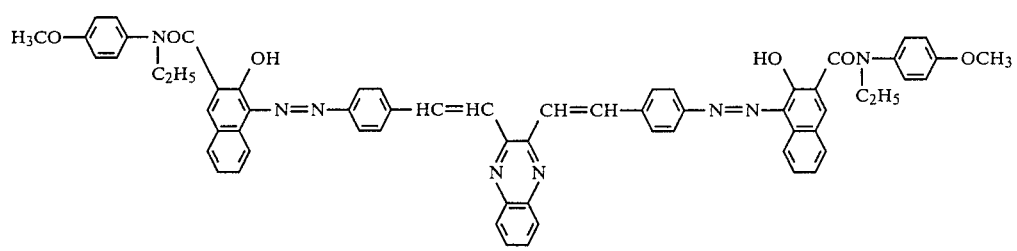
(40)
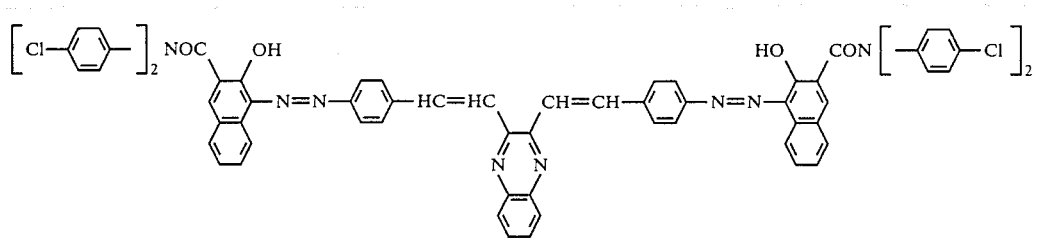
(41)
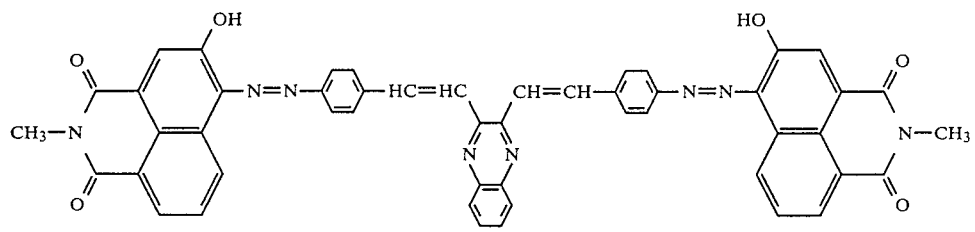
(42)
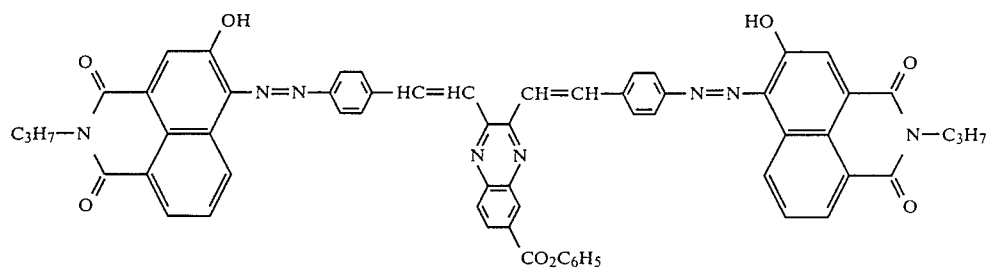
(43)
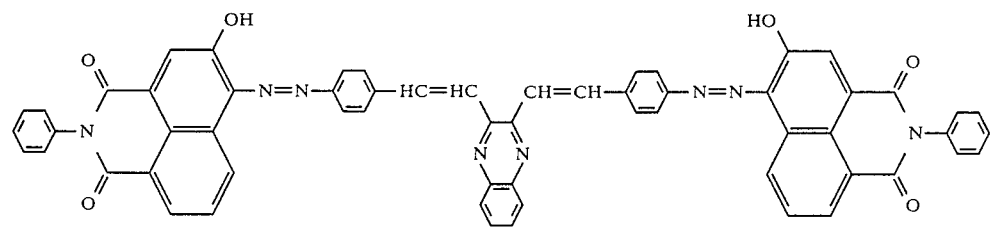
(44)

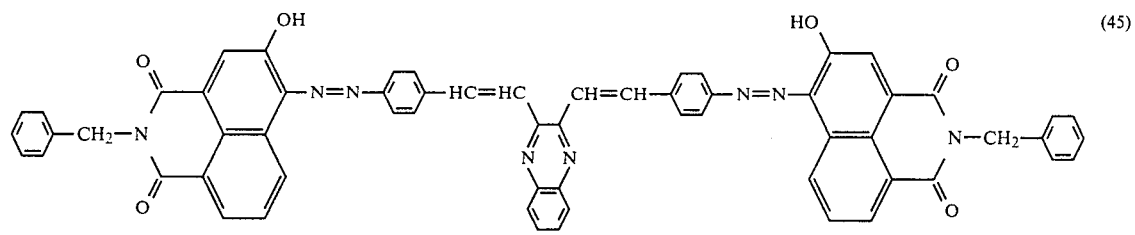
(45)
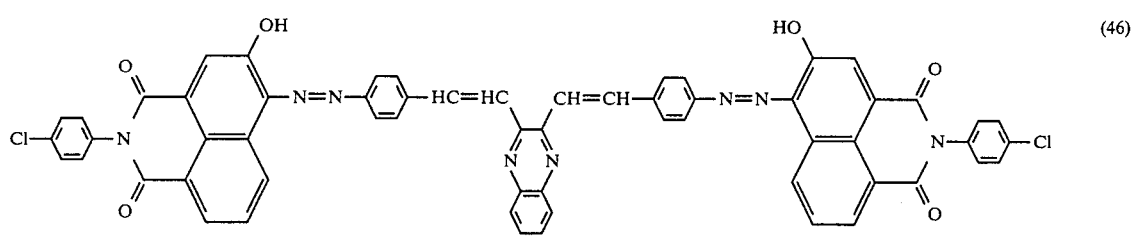
(46)
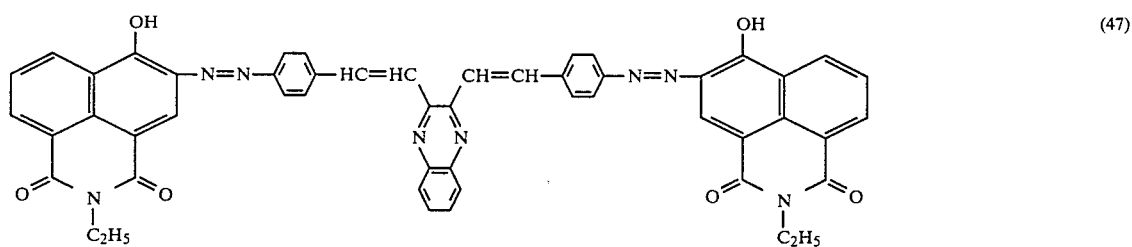
(47)
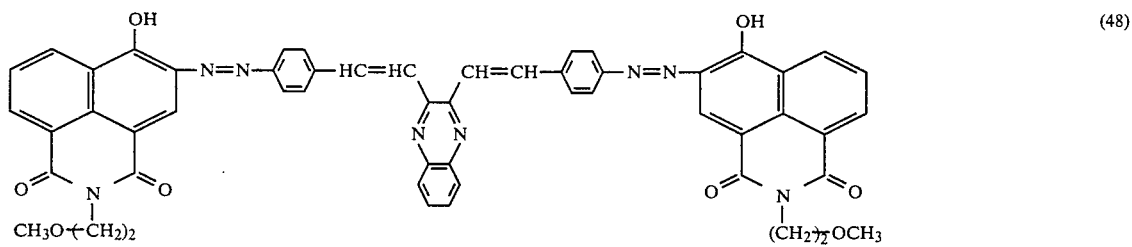
(48)
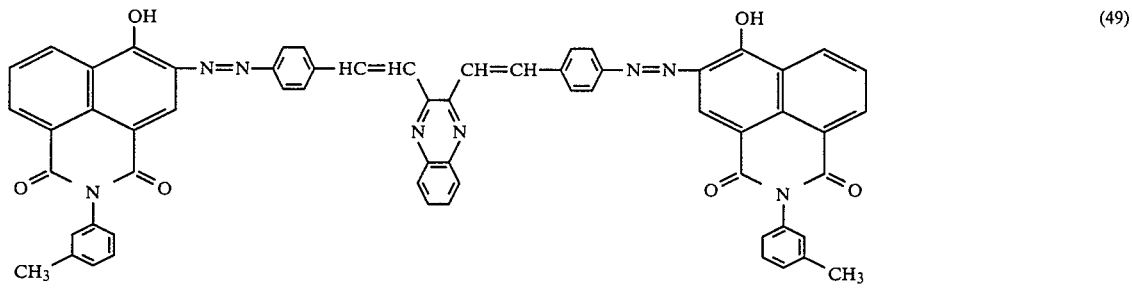
(49)

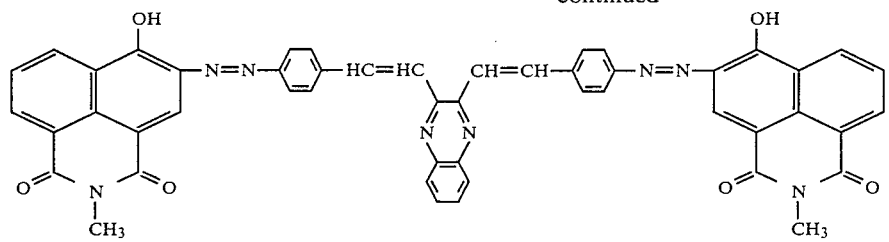 (50)
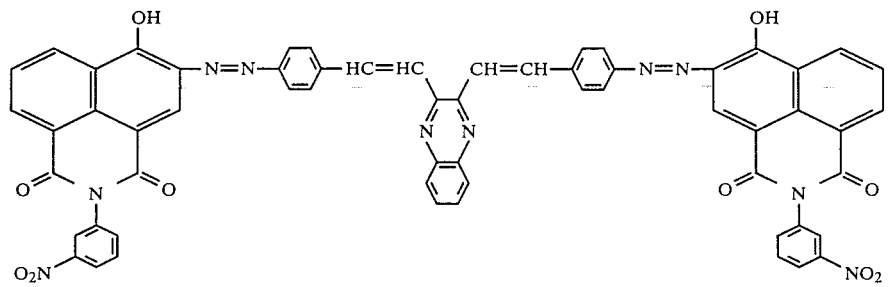 (51)
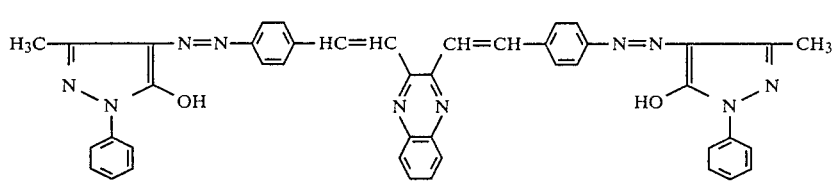 (52)
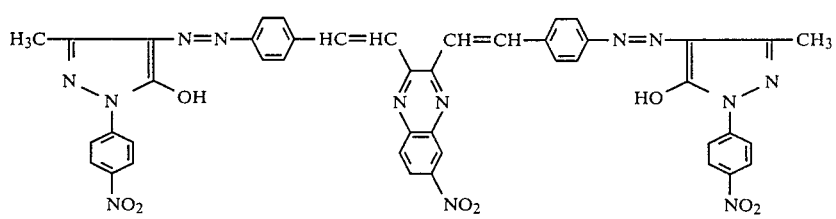 (53)
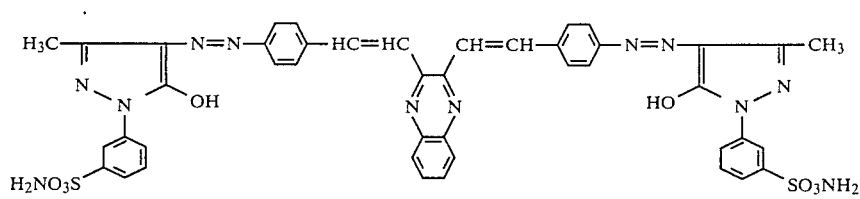 (54)
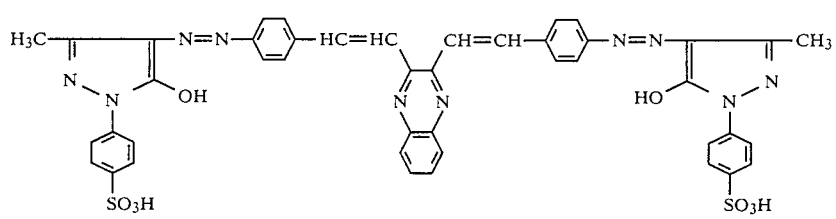 (55)

-continued
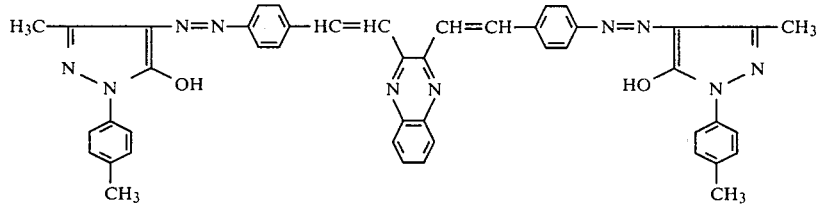
(56)
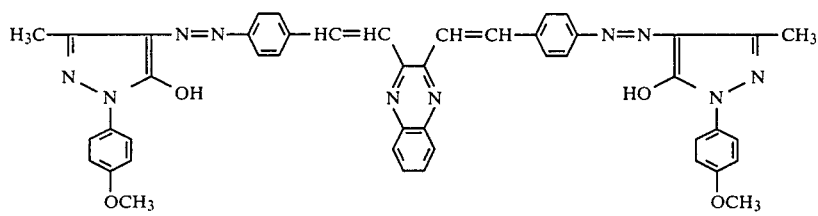
(57)
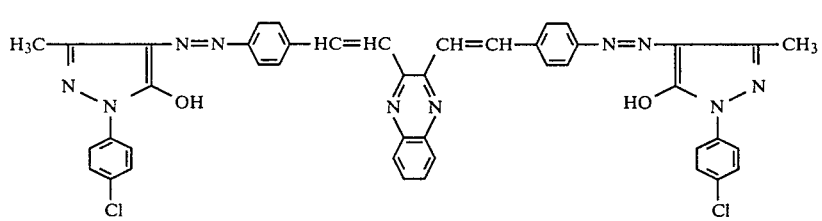
(58)
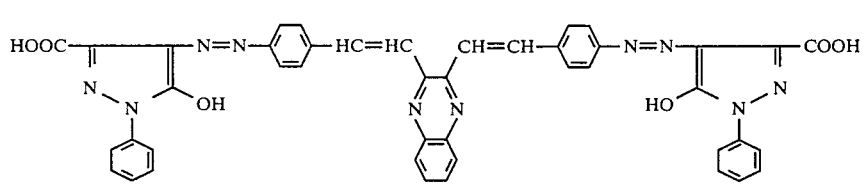
(59)
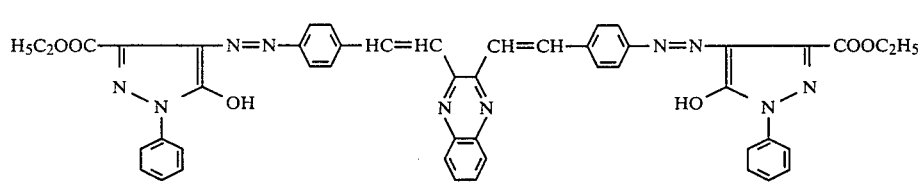
(60)
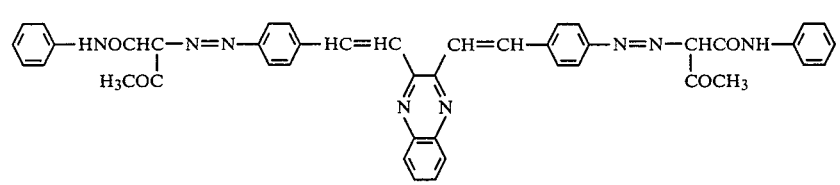
(61)

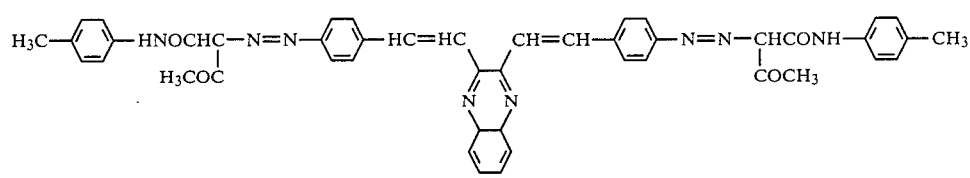 (62)
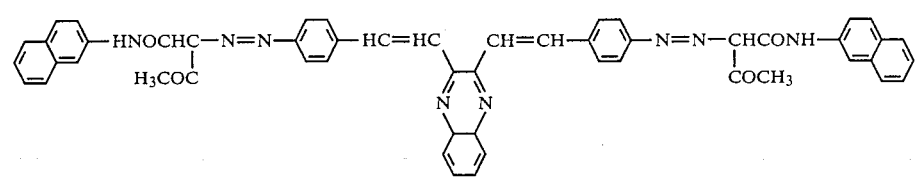 (63)
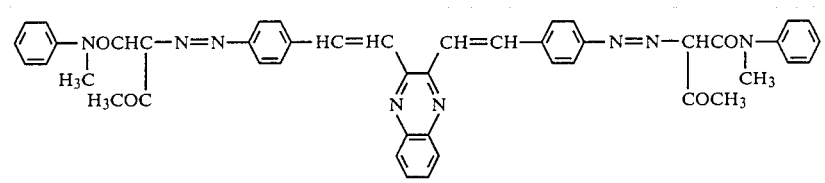 (64)
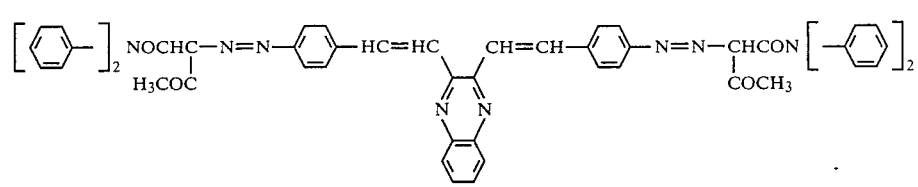 (65)
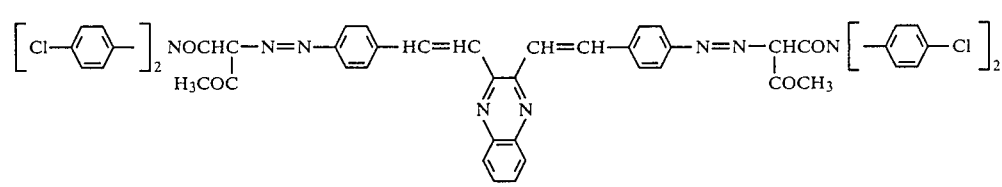 (66)
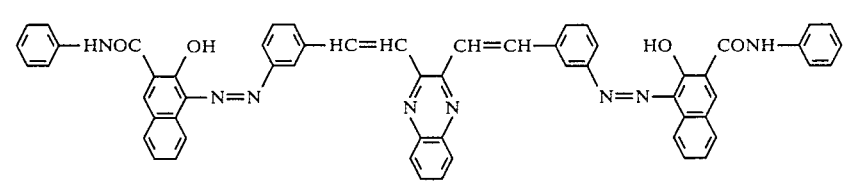 (67)
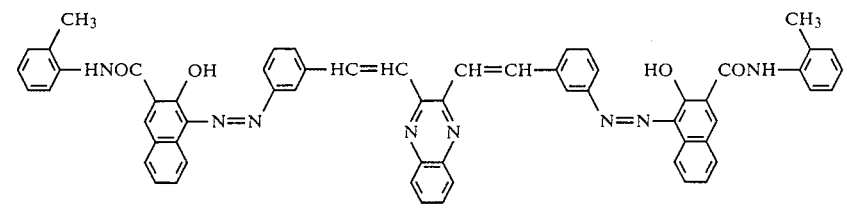 (68)

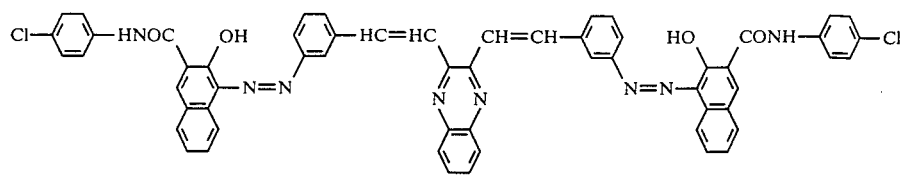
(69)
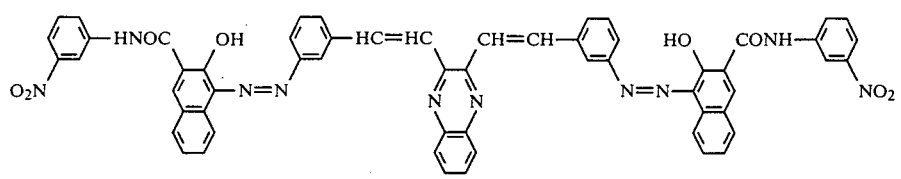
(70)
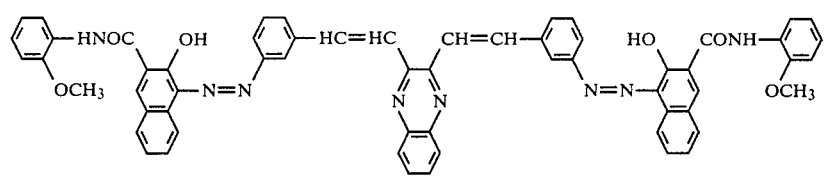
(71)
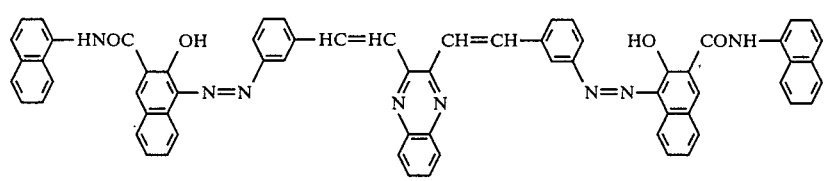
(72)
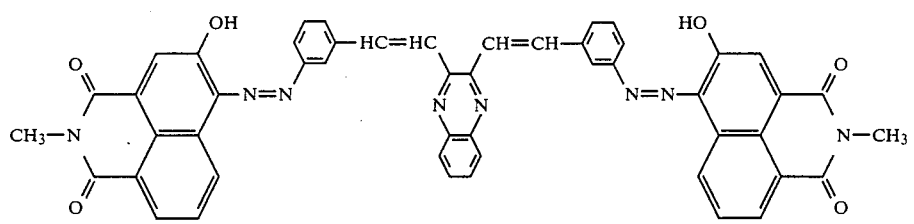
(73)
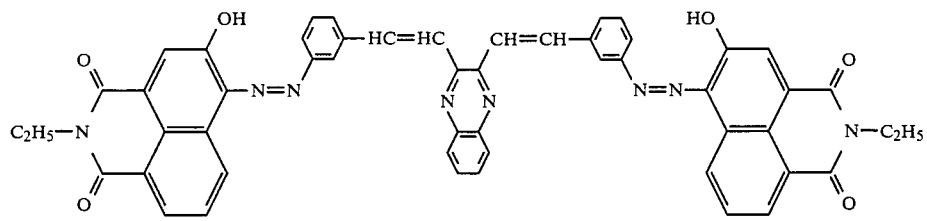
(74)
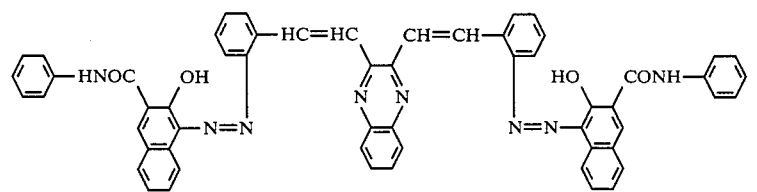
(75)

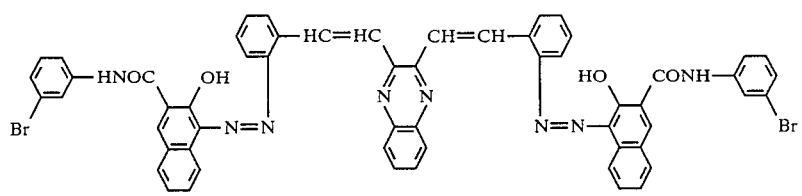
(76)
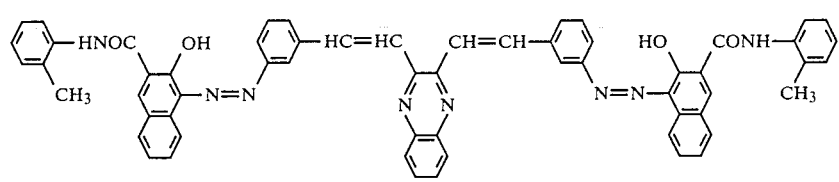
(77)
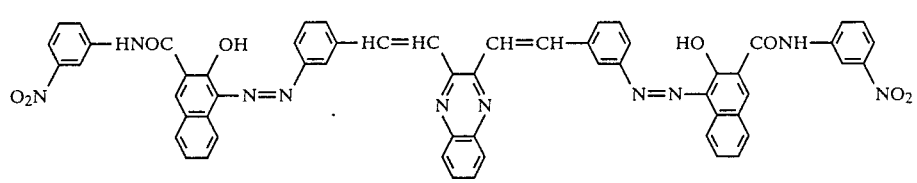
(78)
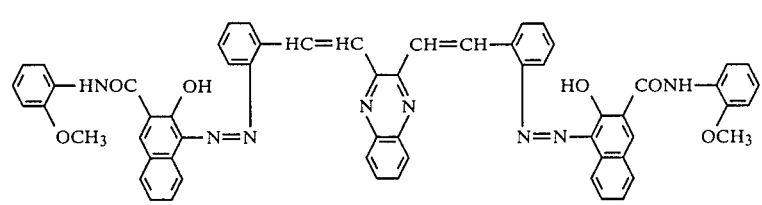
(79)
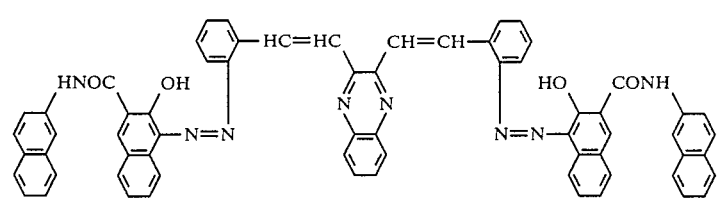
(80)
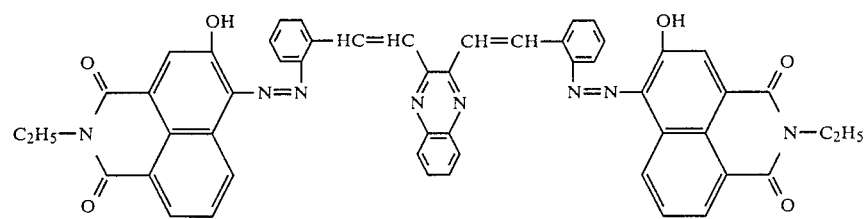
(81)

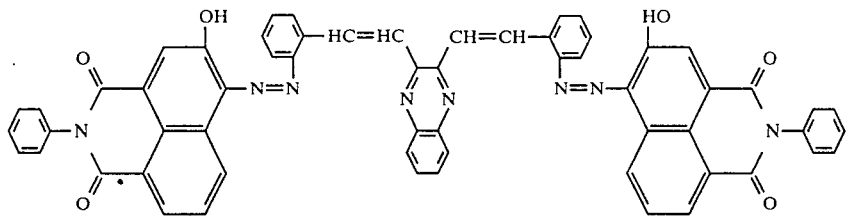

(82)

The novel disazo compounds of the present invention can be prepared in a conventional manner as shown in Scheme 1 below.

SCHEME 1

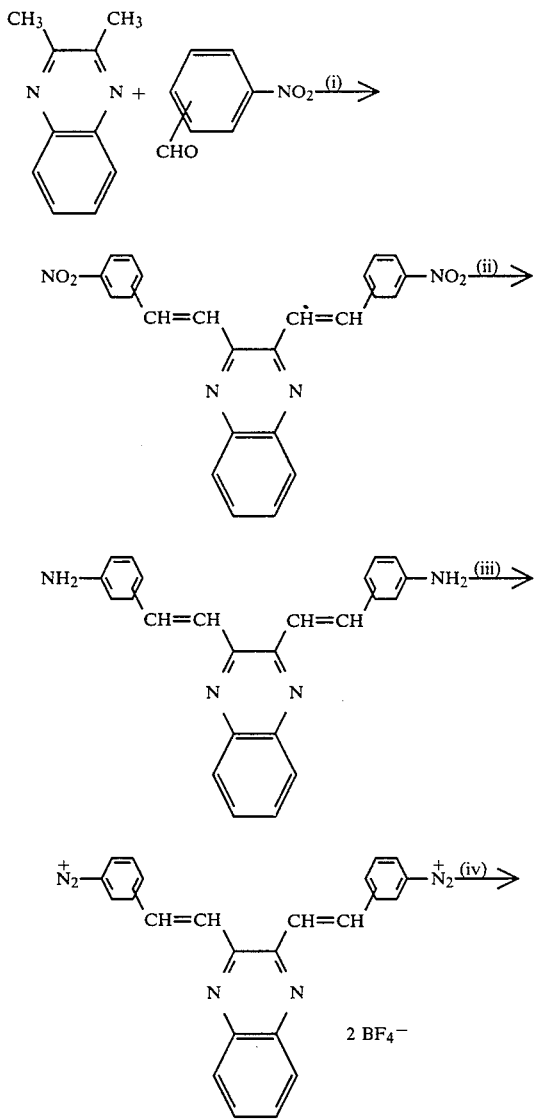

-continued
SCHEME 1

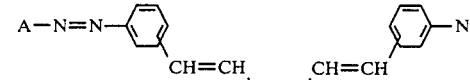

That is, 2,3-dimethylquinoxaline is reacted with nitrobenzaldehyde in a condensing agent such as acetic anhydride at step (i). At step (ii), the nitro group is converted into an amino group using a reducing agent such as iron-hydrochloric acid, etc. At step (iii), diazotization is effected using sodium nitrite. After isolating as a tetrazonium salt, the salt is coupled with a coupler corresponding to the aforesaid pigment (e.g., naphthol AS) in a suitable organic solvent, e.g., N,N-dimethylformamide, in the presence of an alkali to prepare the disazo compound of the present invention.

The aforesaid disazo compound (1) can be prepared, for example, in accordance with Synthesis Examples 1 to 3.

SYNTHESIS EXAMPLE 1

2,3-Bis(4-nitrostyryl)quinoxaline

In 200 ml of acetic anhydride, 16 g of 2,3-dimethylquinoxaline and 30 g of p-nitrobenzaldehyde were heated under reflux for 30 minutes.

After cooling, the resulting crystals were taken out by filtration, washed with 100 ml of benzene and dried to obtain 23.0 g of crystals having a melting point of 281° to 283° C. The yield was 55%. IR absorption spectrum (KBr tablet): 1592, 1510, 1348 cm$^{-1}$

SYNTHESIS EXAMPLE 2

2,3-Bis(4-aminostyryl)quinoxaline:

In a solution of 40 ml of N,N-dimethylformamide and 10 ml of water, 10 g of iron powders and 5.2 g of 2,3-bis(4-nitrostyryl)quinoxaline were dispersed. While stirring, 2.4 ml of hydrochloric acid was dropwise added to the dispersion at room temperature. Stirring was continued for 15 minutes at the same temperature and then for 30 minutes on a steam bath at 70° C. The reaction liquid was transferred to a Soxhlet's extractor and extracted for 3 hours using 300 ml of acetone. The acetone extracts were poured into 500 ml of water to adjust the pH of the liquid to 9 to 10 with an aqueous sodium carbonate solution. The resulting crystals were filtered and dried to obtain 4.3 g (yield 98%) of the product having a melting point of 227° to 228° C.

IR absorption spectrum (KBr tablet): 3430, 3320, 3200, 1600, 1515, 1178 cm$^{-1}$

SYNTHESIS EXAMPLE 2

To diluted hydrochloric acid prepared from 10 ml of conc. hydrochloric acid and 10 ml of water, 1.80 g of 2,3-bis(4-aminostyryl)quinoxaline was added and the resulting mixture was thoroughly stirred for about 30 minutes at room temperature. The mixture was then cooled to 0° C. and a solution of 690 mg of sodium nitrite in 10 ml of water was dropwise added to the mixture of 0° C. over about 30 minutes. Thereafter, stirring was continued for 1 hour at the same temperature.

To a yellow brown solution of the formed tetrazonium salt 6 ml of a 42% hydrogen fluoroborate solution was added and the precipitated crystals were taken out by filtration. After washing the crystals with a small quantity of cold water and drying, 2.48 g (yield, 96%) of tetrazonium fluoroborate crystals were obtained.

In 20 ml of N,N-dimethylformamide, 534 mg of the thus obtained tetrazonium salt and 520 mg of 2-hydroxy-3-naphthoanilide as a coupler were dissolved. To the resulting solution a solution of 860 mg of sodium acetate in 4 ml of water was dropwise added at temperature of 0° C. over about 20 minutes. Thereafter the mixture was stirred for about 2 hours at room temperature.

Then the formed precipitates were taken out by filtration. After washing the precipitates with 200 ml of water, the precipitates were washed with 100 ml of N,N-dimethylformamide while stirring. Then the precipitates were washed with ethanol and dried to obtain 310 mg (yield, 34%) of a disazo pigment, Compound (1). Decomposed at 210°–238° C.

Elemental Analysis as $C_{58}H_{40}N_8O_4$ Calcd. (%): C, 76.30; H, 4.42; N, 12.27 Found (%): C, 76.48; H, 4.51; N, 12.02

IR Absorption Spectrum (KBr tablet) amide 1674 cm$^{-1}$

Visible Absorption Spectrum absorption maximum wavelength: 533 nm (in a dichloromethane solution)

SYNTHESIS EXAMPLES 4 TO 11

Disazo compounds (2), (4), (5), (11), (15), (25), (26) and (47) were synthesized, respectively, in a manner similar to Synthesis Examples 1 to 3 described above. Decomposition temperature, elemental analysis, IR absorption spectrum and visible absorption spectrum of each of the disazo compounds are shown in Table 1 below.

TABLE 1

| Synthesis Example | Coupler | Disazo Compound (decompound) | Elemental Analysis | Calcd. (%) | Found (%) | IR Absorption Spectrum $v_{c=o}$ cm$^{-1}$ (KBr Method) | $\lambda_{max}$: nm (in dichloromethane) |
|---|---|---|---|---|---|---|---|
| 4 | 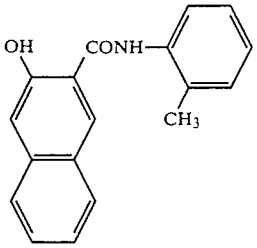 | (2) (203~207° C.) | C H N | 76.25 5.12 71.86 | 76.01 4.95 12.03 | 1678 | 536 |
| 5 | 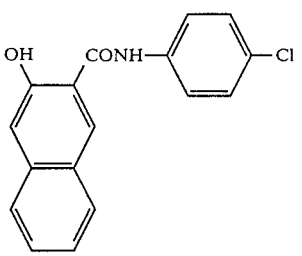 | (4) (282~285° C.) | C H N | 70.95 3.90 11.41 | 70.90 3.62 11.37 | 1670 | 534 |
| 6 | 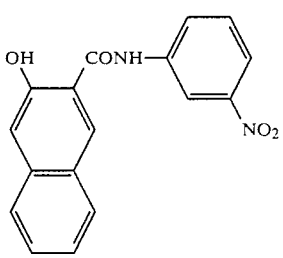 | (6) (211~215° C.) | C H N | 69.45 3.82 13.96 | 69.53 4.11 13.63 | 1680 | 543 |

TABLE 1-continued

| Synthesis Example | Coupler | Disazo Compound (decompound) | Elemental Analysis | | | IR Absorption Spectrum $\nu_{C=O}$ cm$^{-1}$ (KBr Method) | $\lambda_{max}$: nm (in dichloromethane) |
|---|---|---|---|---|---|---|---|
| | | | | Calcd. (%) | Found (%) | | |
| 7 | HO, CONH—(2-CH₃,4-Cl-phenyl), 3-hydroxy-2-naphthamide derivative | (11) (275~277° C.) | C H N | 71.36 4.18 11.10 | 71.28 4.33 11.29 | 1675 | 534 |
| 8 | OH, CONH—(2-OCH₃-phenyl), 3-hydroxy-2-naphthamide derivative | (15) (283~285° C.) | C H N | 73.75 4.95 71.47 | 73.94 4.66 11.50 | 1670 | 535 |
| 9 | OH, CONH—(1-naphthyl), 3-hydroxy-2-naphthamide derivative | (25) (217~222° C.) | C H N | 77.93 4.76 11.02 | 77.85 4.53 11.28 | 1677 | 538 |
| 10 | OH, CONH—(2-naphthyl), 3-hydroxy-2-naphthamide derivative | (26) (214~224° C.) | C H N | 77.93 4.76 11.02 | 78.22 4.85 11.23 | 1676 | 532 |
| 11 | OH-substituted N-ethyl naphthalimide derivative | (47) (295~296.5° C.) | C H N | 70.23 4.42 13.56 | 70.05 4.19 13.26 | 1692 1653 | 538 |

The infrared spectrum (KBr method) of disazo compound (2) is shown in the FIGURE.

Other disazo compounds can also be synthesized in a manner similar to the foregoing synthesis examples except for changing the coupler.

The electrophotographic light sensitive element in accordance with the present invention comprises an electrophotographic light sensitive layer containing at least one of the disazo compounds represented by the general formulae described above. A variety of electrophotographic light sensitive elements are known. The electrophotographic light sensitive elements of the present invention may be of any type but generally have a structure of the following type.

(1) A structure comprising a photoconductive support having provided thereon an electrophotographic light sensitive layer comprising dispersing a disazo compound in a binder or a charge transporting medium.

(2) A structure comprising a photoconductive support having provided thereon a charge generating layer comprising a disazo compound as a main ingredient and further thereon a charge transporting medium layer.

The disazo compound of the present invention acts as a photoconductive substance and, upon absorption of light, generates charge carriers with extremely high efficiency. The generated charges can also be transported using the disazo compound as a medium but it is more effective to transport the charges using a charge transporting compound as a medium.

To prepare the electrophotographic light sensitive element of type (1), finely divided disazo compound particles are dispersed in a binder solution or a solution in which a charge transporting compound and a binder are dissolved and the dispersion is coated on a conductive support followed by drying. The thickness of the electrophotographic light sensitive layer is in the range of 3 to 30 μm, preferably 5 to 20 μm.

To prepare the electrophotographic light sensitive element of type (2), the disazo compound is vacuum deposited on a conductive support, or a solution of the disazo compound in a solvent such as amines, etc. is coated on a conductive support, or a dispersion which is produced by dispersing finely divided disazo compound particles in a suitable solvent, if necessary and desired, in a solution in which a binder is dissolved is coated on a conductive support followed by drying and thereafter, a solution containing a charge transporting compound and a binder is coated thereon followed by drying. The thickness of the disazo compound layer which constitutes a charge generating layer is 4 μm or less, preferably less than 2 μm and the thickness of the charge transporting medium layer is in the range of 3 to 30 μm, preferably 5 to 20 μm.

The disazo compound used in the electrophotographic light sensitive elements of types (1) and (2) is employed after grinding to a particle diameter of 5 μm or less, preferably 2 μm or less with a dispersing machine such as a ball mill, a sand miol, a shaking mill, etc.

If the amount of the disazo compound employed in the electrophotographic light sensitive element of type (1) is too small, sensitivity is poor; if the amount is excessively large, charging ability and strength of the electrophotographic light sensitive layer is poor. The proportion of the disazo compound in the electrophotographic light sensitive layer is generally from 0.01 to 5 times by weight, preferably 0.05 to 3 times by weight, based on the weight of a binder. The proportion of the charge transporting compound which is incorporated if necessary and desired, is in the range of 0.1 to 2 times by weight, preferably 0.3 to 1.3 time by weight, based on the weight of binder. When the charge transporting compound is per se usable as a binder, it is preferred that the amount of the disazo compound to be added be in the range of 0.01 to 0.5 time by weight, based on the weight of a binder.

When a layer containing the disazo compound which constitutes a charge generating layer in the electrophotographic light sensitive element of type (2) is coated and formed, it is preferred that the amount of the disazo compound to be used be not less than 0.1 time by weight that of a binder resin; if the amount is lower than the lower limit, no sufficient sensitivity is obtained. It is preferred that the proportion of the charge transporting compound in the charge transporting medium be in the range of 0.2 to 2 times by weight that of a binder, more preferably in the range of 0.3 to 1.3 time. When a high molecular weight charge transporting compound which is per se usable as a binder is employed, it is unnecessary to use an other binder.

In preparation of the electrophotographic light sensitive element of the present invention, additives such as a plasticizer, a sensitizer, etc. can also be used together with a binder.

Conductive supports which can be used in the electrophotographic light sensitive element of the present invention include supports obtained by depositing conductive materials such as aluminum, indium oxide, $SnO_2$, etc. on a metal plate such as aluminum, copper, zinc, etc. or a plastic sheet or a plastic film such as a polyester, etc., or by coating a dispersion of each of the conductive materials; or a paper sheet conductively treated, etc.

Examples of binders include condensation type resins such as polyamide, polyurethane, polyester, epoxy resin, polyketone, polycarbonate, etc., vinyl polymers such as polyvinyl ketone, polystyrene, poly-N-vinylcarbazole, polyacrylamide, etc.; other resins that are insulative and adhesive are all usable.

Examples of plasticizers include biphenyl, chlorinated biphenyl, o-terphenyl, p-terphenyl, dibutyl phthalate, dimethylglycol phthalate, dioctyl phthalate, triphenyl phosphate, methylnaphthalene, benzophenone, chlorinated paraffin, polypropylene, polystyrene, dilauryl thiodipropionate, 3,5-dinitrosalicylic acid, various fluorocarbon hydrates, etc.

In addition, silicione oil, etc. can also be incorporated to improve the surface property of the electrophotographic light sensitive element.

Examples of sensitizers include chloranil, tetracyanoethylene, methyl violet, rhodamin B, cyanine dyes, merocyanine dyes, pyrilium dyes, thiapyrilium dyes, etc.

Compounds which transport charges are generally classified into two groups: one group is compounds that transport electrons and another group is those that transport positive holes. In the electrophotographic light sensitive element of the present invention, both can be used. Examples of compounds that transport electrons are compounds having an electron-attractive group, e.g., 2,4,7-trinitro-9-fluorenone, 2,4,5,7-tetranitro-9-fluorenone, 9-dicyanomethylene-2,4,7-trinitrofluorenone, 9-dicyanomethylene-2,4,5,7-tetranitrofluorenone, tetranitrocarbazole chloranil, 2,3-dichloro-5,6-dicyanobenzoquinone, 2,4,7-trinitro-9,10-phenathrenequinone, tetrachlorophthalic anhydrice, tetracyanoethylene, tetracyanoquinodimethane, etc.

Compounds for transporting positive holds include compounds having an electron-donating group, e.g., high molecular weight compounds including:
(1) polyvinylcarbozole and derivatives thereof as described in Japanese Patent Publication No. 10966/59;
(2) vinyl polymers such as polyvinylpyrene, polyvinylanthracene, poly-2-vinyl-4-(4'-dimethylaminophenyl)-5-phenyloxazole, poly-3-vinyl-N-ethylcarbazole, etc., as described in U.S. Pat. Nos. 3,232,755 and 3,162,532.
(3) polymers such as polyacenaphthylene, polyindene or copolymers of acenaphthylene with styrene as described in U.S. Pat. No. 3,169,060;
(4) condensed resins such as pyrene-formaldehyde resin, bromopyrene-formaldehyde resin, ethyl carbazole-formaldehyde resin, etc. as described in U.S. Pat. Nos. 3,842,038 and 3,881,922, etc.;

(5) various triphenylmethane polymers as described in Japanese Patent Applications OPI No. 90833/81 and 161550/81; and low molecular weight compounds including:
(6) triazole derivative as described in U.S. Pat. No. 3,112,197, etc.;
(7) oxadiazole derivatives as described in U.S. Pat. No. 3,189,447, etc.;
(8) imidazole derivatives as described in Japanese Patent Publication No. 16096/62, etc.;
(9) polyarylalkane derivatives as described in U.S. Pat. Nos. 3,615,402, 3,820,989, 3,542,544, 3,542,547, 3,963,799 and 4,127,412, Japanese Patent Applications (OPI) No. 17105/80 4148/81, 108667/80, 156953/80, 93224/76 and 36656/81, etc.;
(10) pyrazoline derivatives and pyrazolone derivatives as described in U.S. Pat. Nos. 3,180,729, 3,837,851 and 4,278,746, Japanese Patent Applications OPI Nos. 88064/80, 88065/80, 51086/80, 80051/81, 88141/81, 45545/82, 112637/79, 105537/74 and 74546/80, etc.;
(11) phenylenediamine derivatives as described in U.S. Pat. No. 3,615,404, Japanese Patent Publication No. 10105/76, Japanese Patent Applications OPI Nos. 83435/79, 110836/79 and 119925/79, Japanese Patent Publications Nos. 3712/71 and 28336/72, etc.;
(12) arylamine derivatives as described in U.S. Pat. No. 3,567,450, Japanese Patent Publication No. 35702/74, German Patent (DAS) No. 1,110,518, U.S. Pat. Nos. 3,180,703, 3,240,597, 3,658,520, 4,232,103, 4,175,961 and 4,012,376, Japanese Patent Applications OPI Nos. 144250/80 and 119132/81, Japanese Patent Publication No. 27577/64, Japanese Patent Application No. 22437/81, etc.;
(13) amino-substituted chalcone derivatives as described in U.S. Pat. No. 3,526,501;
(14) N,N-bicarbazyl derivatives as described in U.S. Pat. No. 3,542,546, etc.;
(15) oxazole derivatives as described in U.S. Pat. No. 3,257,203, etc.;
(16) styryl anthracene derivatives as described in Japanese Patent Application OPI No. 46234/81, etc.;
(17) fluorenone derivatives as described in U.S. Pat. No. 4,245,021, etc.;
(18) hydrazone derivatives as described in U.S. Pat. No. 3,717,462, Japanese Patent Applications OPI Nos. 59143/79 (corresponding to U.S. Pat. No. 4,150,987), 52063/80, 52064/80, 46760/80, 85495/80 and 64244/82, Japanese Patent Applications Nos. 85495/80 and 33832/81, etc.

In the present invention, the compounds which transport charges are not limited to compounds listed in (1) to (18) but all other known charge carrier-transporting compounds can be used.

These charge transporting materials can be used in a combination of two or more, if desired and necessary.

In the electrophotographic light sensitive element thus obtained, an adhesive layer or a barrier layer can also be provided, if necessary and desired, between the conductive support and the light sensitive layer. Materials used for these layers are polyamide, nitrocellulose, aluminum oxide, etc. It is preferred that the thickness of each of these layers be not greater than 1 $\mu$m.

The electrophotographic light sensitive element of the present invention has been described in detail. The electrophotographic light sensitive element of the present invention has characteristics that sensitivity is generally high and durability is excellent.

The electrophotographic light sensitive element of the present invention is widely applicable, in addition to electrophotographic copying, to fields of light sensitive elements for printers using a laser or Braun tube as a light source.

The photoconductive composition containing the disazo compound of the present invention can be used as a photoconductive layer of an imaging tube of a video camera and as a photoconductive layer of a solide-state imaging device containing a light-receiving layer (photoconductive layer) and provided over the entire surface of a one- or two-dimensionally arranged semi-conductor circuit that effects transfer of signals or scanning.

Further as is described in A. K. Ghosh and Tom Feng, *J. Appl. Phys.*, vol. 49 (12), page 5982 (1978), the photoconductive composition of the present invention can also be used as a photoconductive layer of a solar cell.

A printing plate having a high resolving power, high durability and high sensitivity can also be obtained, as disclosed in Japanese Patent Publication No. 17162/72, Japanese Patent Applications OPI Nos. 19063/80, 161250/80 and 33579/81, etc., by dispersing the disazo compound of the present invention in an alkali soluble resin liquid such as a phenol resin, together with the foregoing charge transporting compounds such as oxadiazole derivatives, hydrazone derivatives, etc., coating the dispersion on a conductive support such as aluminum, etc., drying, imagewise exposing, toner developing and etching with an alkali aqueous solution. In addition, a print circuit can also be prepared.

The present invention will next be explained in more detail with reference to the examples but is not deemed to be limited to the examples, wherein all parts are by weight.

EXAMPLE 1

To 95 parts of dichloromethane, 1 part of disazo compound (1), 5 parts of 4,4'-bis(diethylamino)-2,2'-dimethyltriphenylmethane and 5 parts of bisphenol A polycarbonate were added. The mixture was pulverized in a ball mill and mixed to prepare a liquid. The resulting coating liquid was coated on a conductive transparent support (which was prepared by depositing to form an indium oxide layer at the surface of a polyethylene terephthalate film having a thickness of 100 $\mu$m; surface resistivity, $10^3$ ohm) using a wire wound rod and then dried to prepare an electrophotographic light sensitive element having a single layer type electrophotographic light sensitive layer having a thickness of about 10 $\mu$m.

The electrophotographic light sensitive element was electrically charged to +500 V through corona discharge of +5 KV using an electrostatic copying paper test apparatus (manufactured by Kawaguchi Electric Co., Ltd., Model SP-428) and then exposed to light using a tungsten lump having a color temperature of 3000° K. such that the surface showed 4 luxes. The time period required until the surface potential was decayed to half of the initial surface potential was determined; a half-decay exposure amount $E_{50}$ (lux.sec) was 15 (lux.-sec). The $E_{50}$ value after repeating two steps of charging and exposure 3000 times was substantially the same.

EXAMPLES 2 TO 11

Electrophotographic light sensitive elements each having a single layer structure were prepared in a manner similar to Example 1 except that disazo compounds (2), (4), (5), (11), (15), (25), (26), (47), (67) and (76) were employed in place of disazo compound (1), respectively. The half-decay exposure amount of each of the electrophotographic light sensitive elements due to positive charging was measured in a manner similar to Example 1.

The results are shown in Table 2 below.

TABLE 2

| Example | Disazo Compound | $E_{50}$ (lux · sec) |
| --- | --- | --- |
| 2 | 2 | 13 |
| 3 | 4 | 18 |
| 4 | 5 | 15 |
| 5 | 11 | 19 |
| 6 | 15 | 39 |
| 7 | 25 | 36 |
| 8 | 26 | 19 |
| 9 | 47 | 5 |
| 10 | 67 | 11 |
| 11 | 76 | 14 |

EXAMPLE 12

A mixture of 5 g of disazo compound (1) and a solution of 2 g of polyvinyl butyral resin (degree of butyralization, 63 mol%) in 100 ml of ethanol was dispersed for 20 hours in a ball mill. Thereafter, the dispersion was coated on a conductive support (prepared by depositing to form an aluminum layer onto the surface of a polyethylene terephthalate film having a thickness of 100 μm; surface resistivity, $10^3$ ohms) using a wire wound rod and then dried to prepare charge generating layer having a thickness of 1 μm.

Then, a solution of 2 parts of p-(diphenylamino)benzoaldehyde-N'-methyl-N'-phenylhydrazone having the following structure:

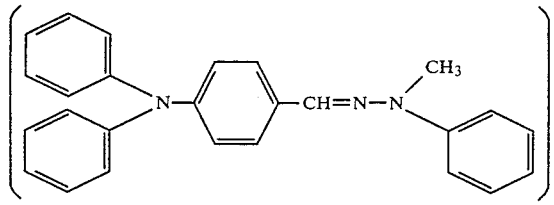

and 4 parts of bisphenol A polycarbonate in 60 parts of dichloromethane was coated on the thus obtained electron-generating layer and then dried to form a charge transporting layer having a thickness of 18 μm. Thus, an electrophotographic light sensitive element having an electrophotographic light sensitive layer composed of two layers was prepared.

After the electrophotographic light sensitive element was electrically charged to −900 V through corona discharge of −5 KV, the half-decay exposure amount was measured and $E_{50}$ showed 32 (lux.sec).

EXAMPLES 13 TO 22

Electrophotographic light sensitive elements having a two layer structure were prepared in a manner similar to Example 12 except that disazo compounds (3), (7), (8), (16), (41), (50), (59), (65), (68) and (77) were employed in lieu of disazo compound (1), respectively. $E_{50}$ was measured in a similar fashion.

The results are shown in Table 3 below.

TABLE 3

| Example | Disazo Compound | $E_{50}$ (lux · sec) |
| --- | --- | --- |
| 13 | 3 | 8.0 |
| 14 | 7 | 4.4 |
| 15 | 8 | 6.4 |
| 16 | 11 | 2.5 |
| 17 | 41 | 21 |
| 18 | 50 | 4.5 |
| 19 | 59 | 35 |
| 20 | 65 | 47 |
| 21 | 68 | 38 |
| 22 | 77 | 4.2 |

EXAMPLE 23

An electron-transporting layer having a thickness of 12 μm was formed on an electron-generating layer having a thickness of 1 μm in a manner similar to Example 12 except that 4 parts of 2,4,7-trinitro-9-fluorenone were employed as the electron-transporting layer in lieu of p-(diphenylamino)benzaldehyde-N'-methyl-N'-phenylhydrazone.

This electrophotographic light sensitive element were electrically charged to +600 V through a corona discharge of +5 KV and $E_{50}$ was measured; it was 18 (lux.sec).

EXAMPLES 24 TO 26

Electrophotographic light sensitive elements having a two layer structure were prepared in a manner similar to Example 19 except that disazo compounds (2), (13) and (20) were employed in lieu of disazo compound (1), respectively. $E_{50}$ was measured in a similar fashion.

The results are shown in Table 4 below.

TABLE 4

| Example | Disazo Compound | $E_{50}$ (lux · sec) |
| --- | --- | --- |
| 24 | 2 | 29 |
| 25 | 13 | 45 |
| 26 | 20 | 11 |

EXAMPLE 27

To 25 parts of dichloromethane, 1 part of disazo compound (1) and 1 part of bisphenol A polycarbonate were added. The mixture was pulverized in a ball mill and mixed to prepare a coating liquid. The coating liquid was coated on a conductive support (prepared by depositing to form an aluminum layer onto the surface of a polyethylene terephthalate film having a thickness of 100 μm; surface resistivity, $10^3$ ohms) using a wire wound rod and then dried to obtain an electrophotographic light sensitive element having a single layer type electrophotographic light sensitive layer having a thickness of about 2 μm.

After the electrophotographic light sensitive element was electrically charged to +100 V by a corona discharge of +5 KV, $E_{50}$ was measured and showed 20 (lux.sec).

EXAMPLE 28

A single layer type electrophotographic light sensitive element was prepared in a manner similar to Example 27 except that disazo compound (10), (43), (56) and

(62) were employed in place of disazo compound (1), respectively. $E_{50}$ was measured in a similar fashion.

The results are shown in Table 5 below.

TABLE 5

| Example | Disazo Compound | $E_{50}$ (lux · sec) |
|---|---|---|
| 28 | 10 | 16 |
| 29 | 43 | 25 |
| 30 | 56 | 36 |
| 31 | 62 | 18 |

EXAMPLE 32

To 30 parts of ethylene glycol monomethyl ether, 1 part of disazo pigment (1), 1 part of p-(diphenylamino)-benzoaldehyde-N'-methyl-N'-phenylhydrazone used in Example 10 and 6 parts of m-cresol formaldehyde resin were added. The mixture was pulverized in a ball mill and mix to obtain a coating liquid. The coating liquid was coated on an aluminum plate of about 0.25 mm thickness which was grained using a grainer, cathodically oxidized and underwent sealing treatment, using a wire wound rod. After drying at 90° C. for 10 minutes and at 50° C. for 1 day, a sample having a thickness of about 6 μm was prepared.

The sample was then subjected to a corona discharge until the surface potential showed 500 V. After exposing (300 lux.sec) to negative images using a tungsten light, reversal development was performed with Mitsubishi Dia Fax Master LOM-ED Toner (manufactured by Mitsubishi Paper Mfg. Co., Ltd.) to obtain very clear and sharp positive images on a base plate for printing. The base plate for printing was immersed in a 10-fold diluted etching solution of DP-1 (made by Fumi Photo Film Co., Ltd., an aqueous sodium silicate solution) for 1 minute to dissolve out and eliminate the areas (non-image areas) of the light sensitive layer to which no toner was adhered. As a result, the pigment at the non-image areas was easily removed together with the binder so that a printing plate having clear images thereon could be formed.

While the invention has been described in detail and with reference to specific embodiments thereof, it will be apparent to one skilled in the art that various changes and modifications can be made therein without departing from the spirit and scope thereof.

What is claimed is:

1. A photoconductive composition comprising a disazo compound represented by general formula (I), (II) or (III)

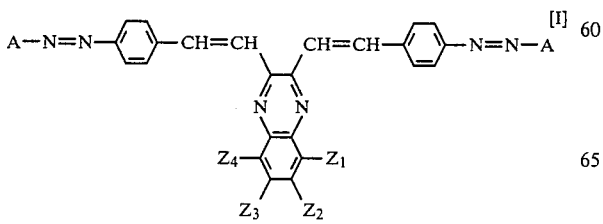

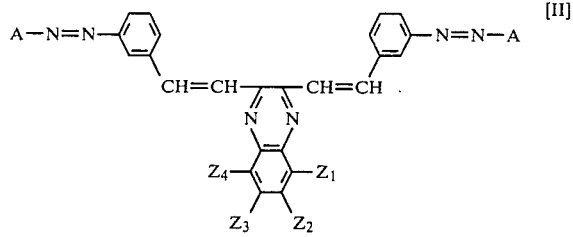

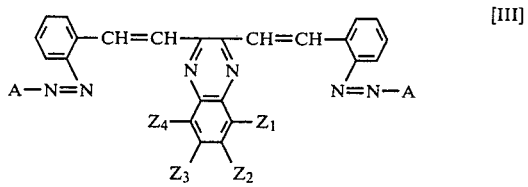

wherein:

A represents:

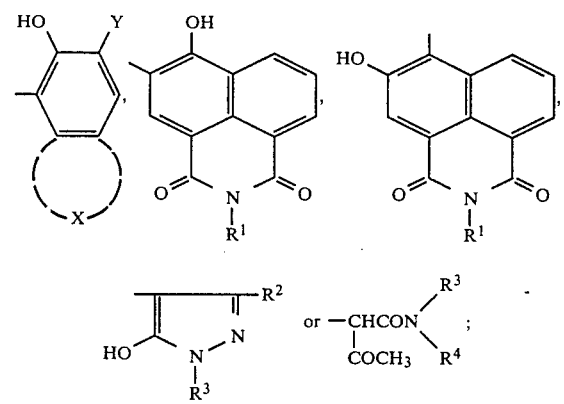

wherein X represents an atomic group necesssary to complete an aromatic ring or a heterocyclic ring (said ring may be substituted or unsubstituted), by condensing with the benzene ring in the above formula to which a hydroxy group and Y are attached;

Y represents:

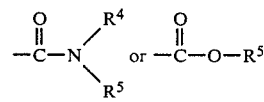

$R^1$ represents a hydrogen atom, an alkyl group, a phenyl group or a substituted group thereof;

$R^2$ represents a hydrogen atom, a lower alkyl group, a carbamoyl group, a carboxyl group, an alkoxycarbonyl group, an aryloxycarbonyl group, or a substituted or unsubstituted amino group;

$R^3$ and $R^5$ each represents an alkyl group, an aromatic ring group, a heterocyclic aromatic ring group or a substituted group thereof;

$R^4$ represents a hydrogen atom, an alkyl group, a phenyl group or a substituted group thereof;

$Z_1$, $Z_2$, $Z_3$ and $Z_4$, which may be the same or different represents a hydrogen atom, a halogen atom, an alkyl group, a nitro group, an alkoxy group, an alkoxycarbonyl group or an aryloxycarbonyl group.

2. An electrophotographic light sensitive element comprising an electrophotographic light sensitive layer containing a disazo compound represented by general formula (I), (II) or (III)

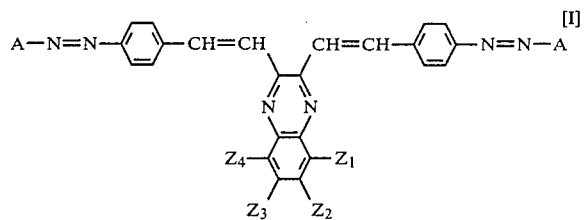

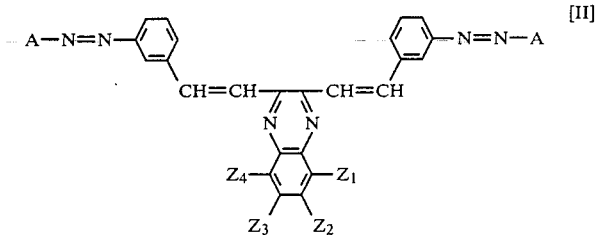

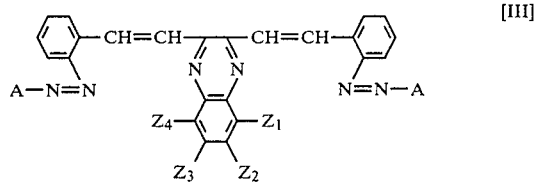

wherein:
A represents:

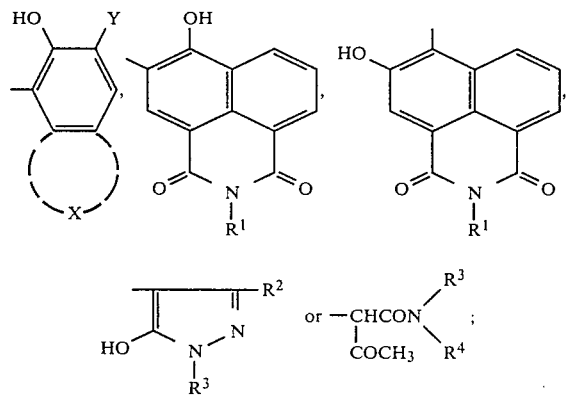

wherein X represents an atomic group necessary to complete an aromatic ring or a heterocyclic ring (said ring may be substituted or unsubstituted), by condensing with the benzene ring in the above formula to which a hydroxy group and Y are attached;

Y represents:

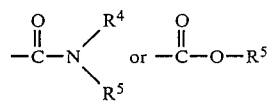

$R^1$ represents a hydrogen atom, an alkyl group, a phenyl group or a substituted group thereof;

$R^2$ represents a hydrogen atom, a lower alkyl group, a carbamoyl group, a carboxyl group, an alkoxycarbonyl group, an aryloxycarbonyl group, or a substituted or unsubstituted amino group;

$R^3$ and $R^5$ each represents an alkyl group, an aromatic ring group, a heterocyclic aromatic ring group or a substituted group thereof;

$R^4$ represents a hydrogen atom, an alkyl group, a phenyl group or a substituted group thereof;

$Z_1$, $Z_2$, $Z_3$ and $Z_4$, which may be the same or different, represents a hydrogen atom, a halogen atom, an alkyl group, a nitro group, an alkoxy group, an alkoxycarbonyl group or an aryloxycarbonyl group.

3. An electrophotographic light sensitive element, as claimed in claim 2, wherein the electrophotographic light sensitive layer is provided on a photoconductive support.

4. An electrophotographic light sensitive element as claimed in claim 2, wherein the electrophotographic light sensitive layer comprises a binder or a charge transporting medium and disazo compounds represented by the general formula (I), (II) or (III) dispersed therein.

5. An electrophotographic light sensitive element as claimed in claim 2, wherein the light sensitive layer comprises a charge generating layer containing disazo compounds represented by the general formula (I), (II) or (III) and a charge transporting layer.

6. An electrophotographic light sensitive element as claimed in claim 4, wherein the electrophotographic light sensitive layer has a thickness in the range of 3 to 30μ.

7. An electrophotographic light sensitive element as claimed in claim 2, wherein the disazo compounds are present in the form of particles having a size of 5μ or less.

8. An electrophotographic light sensitive element as claimed in claim 4, wherein the electrophotographic light sensitive layer includes a binder and the disazo compounds which are present in the electrophotographic light sensitive layer in a weight amount of 0.01 to 5 times the weight of the binder.

9. An electrophotographic light sensitive element as claimed in claim 5, wherein the charge generating layer has a thickness of 4μ or less.

10. An electrophotographic light sensitive element as claimed in claim 5, wherein the disazo compounds are present in the charge generating layer in a weight amount of 0.1 or more times the weight of the binder.

* * * * *